Sept. 1, 1953  G. J. KOREN  2,650,396
SAND HANDLING APPARATUS
Filed April 8, 1949  16 Sheets-Sheet 1
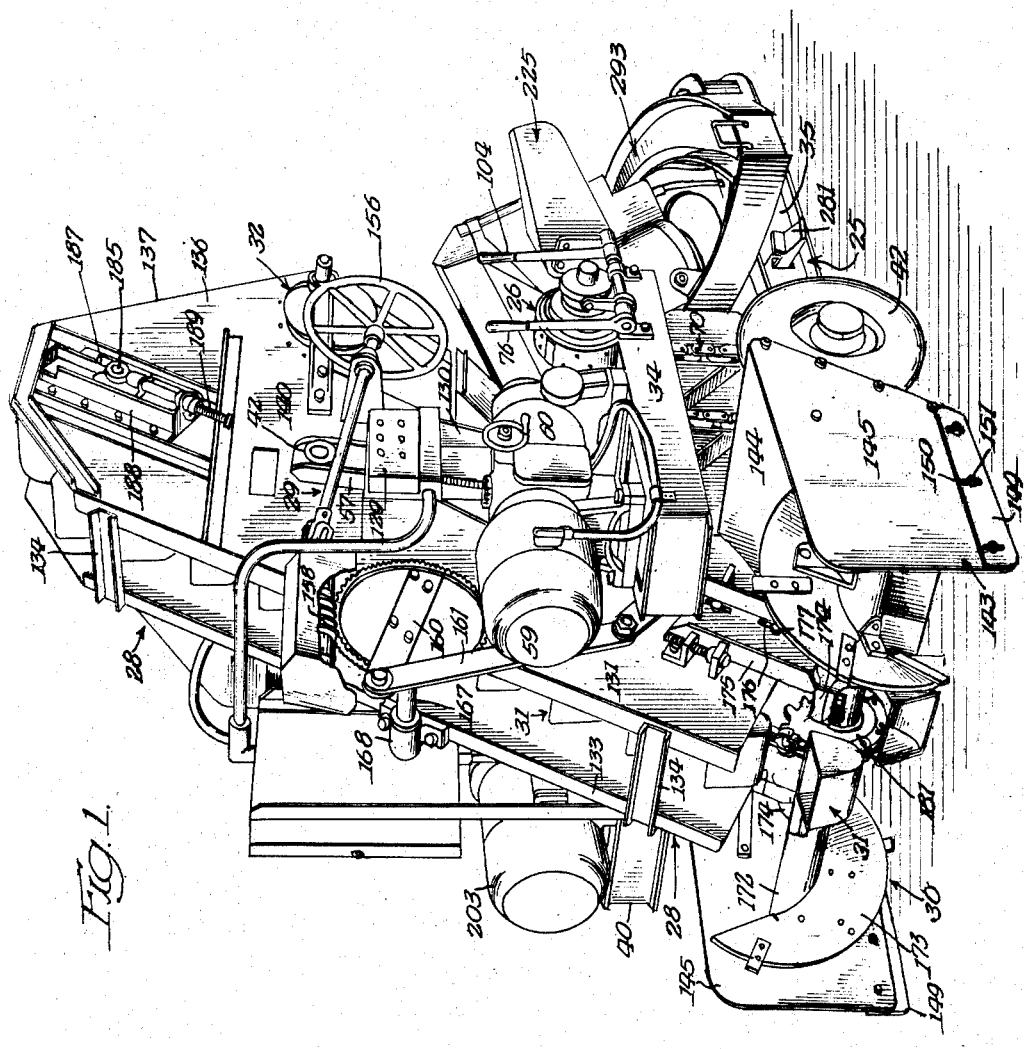
Inventor
George J. Koren
By: Fred Gerlach
atty.

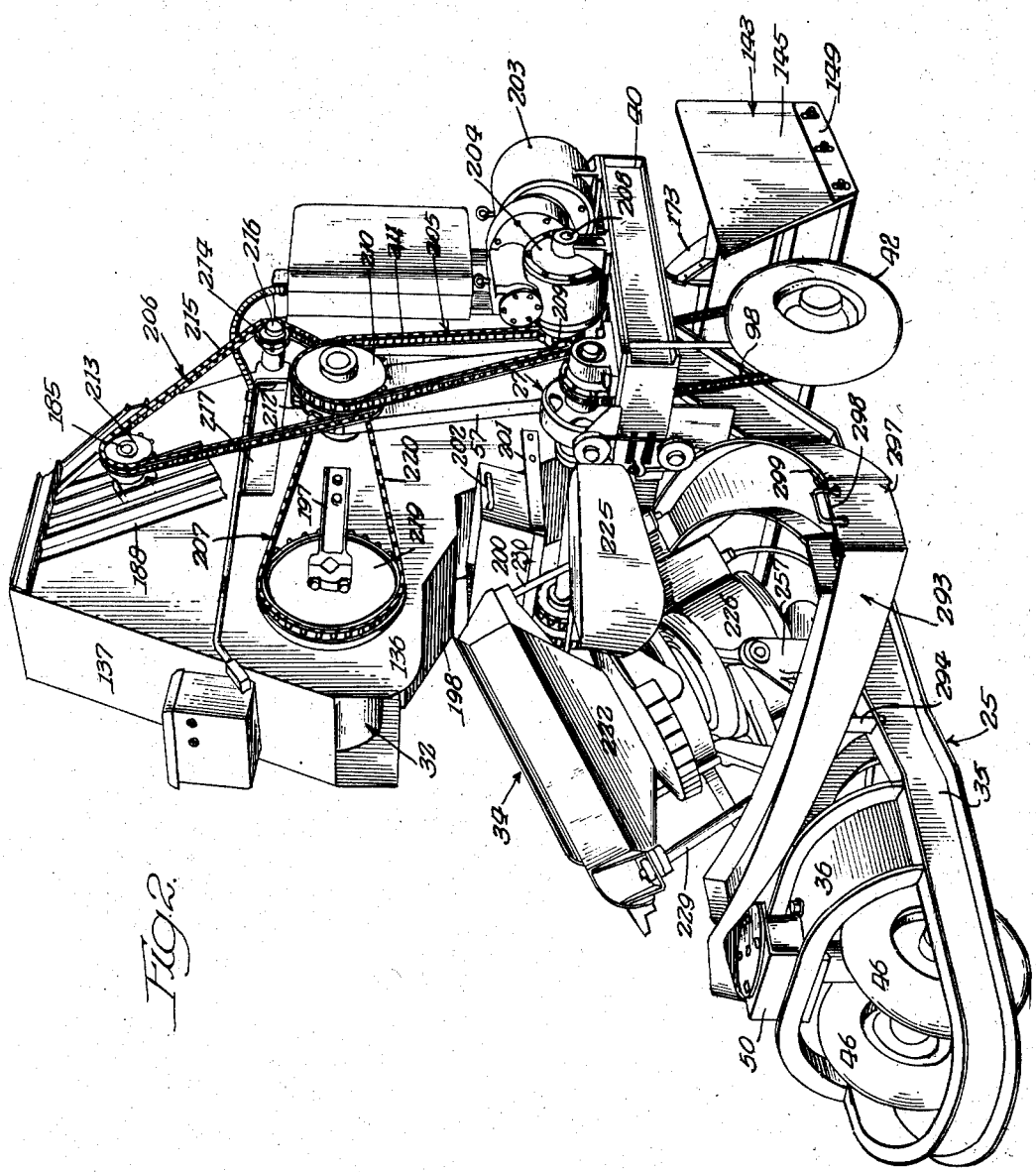

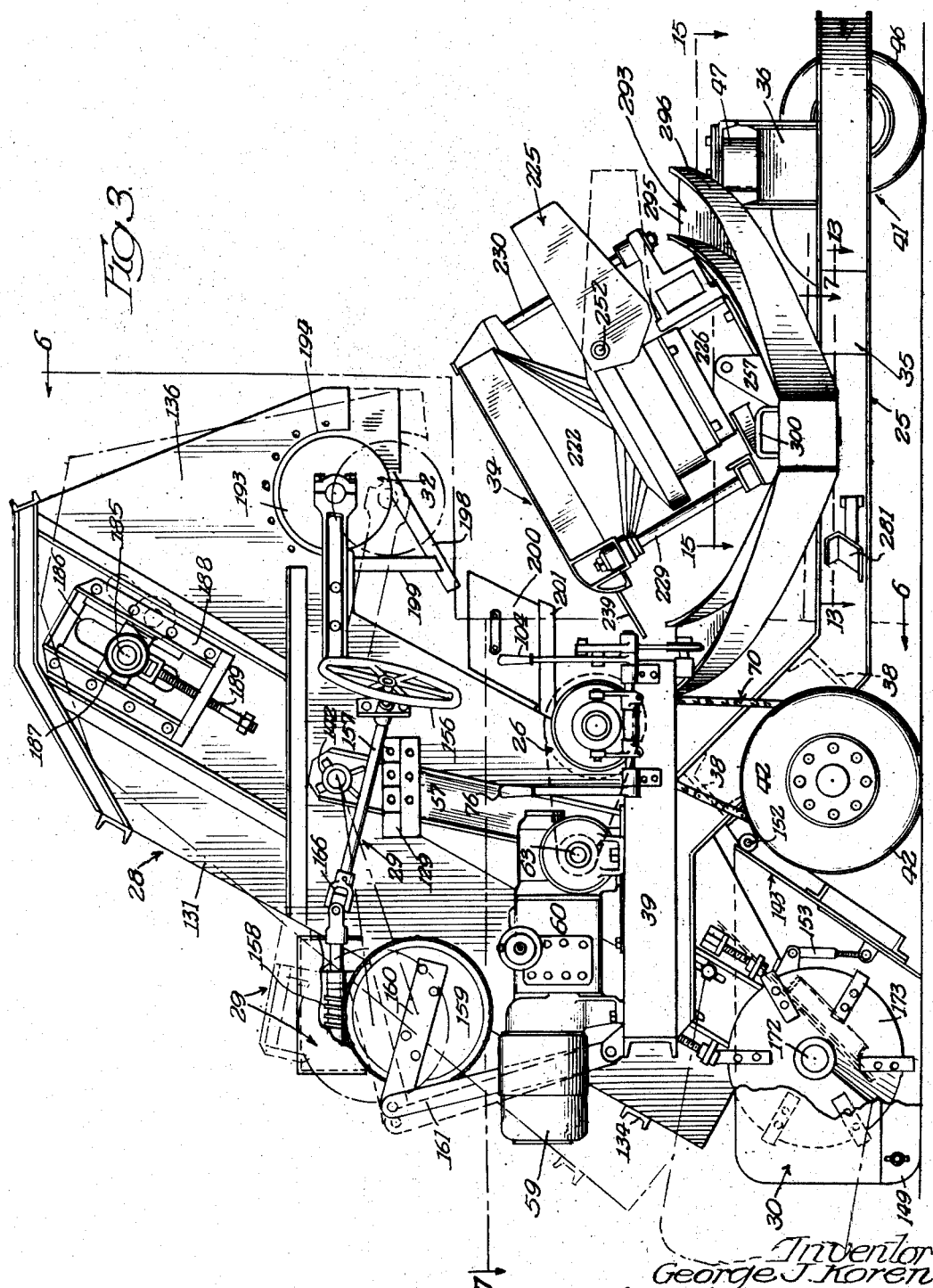

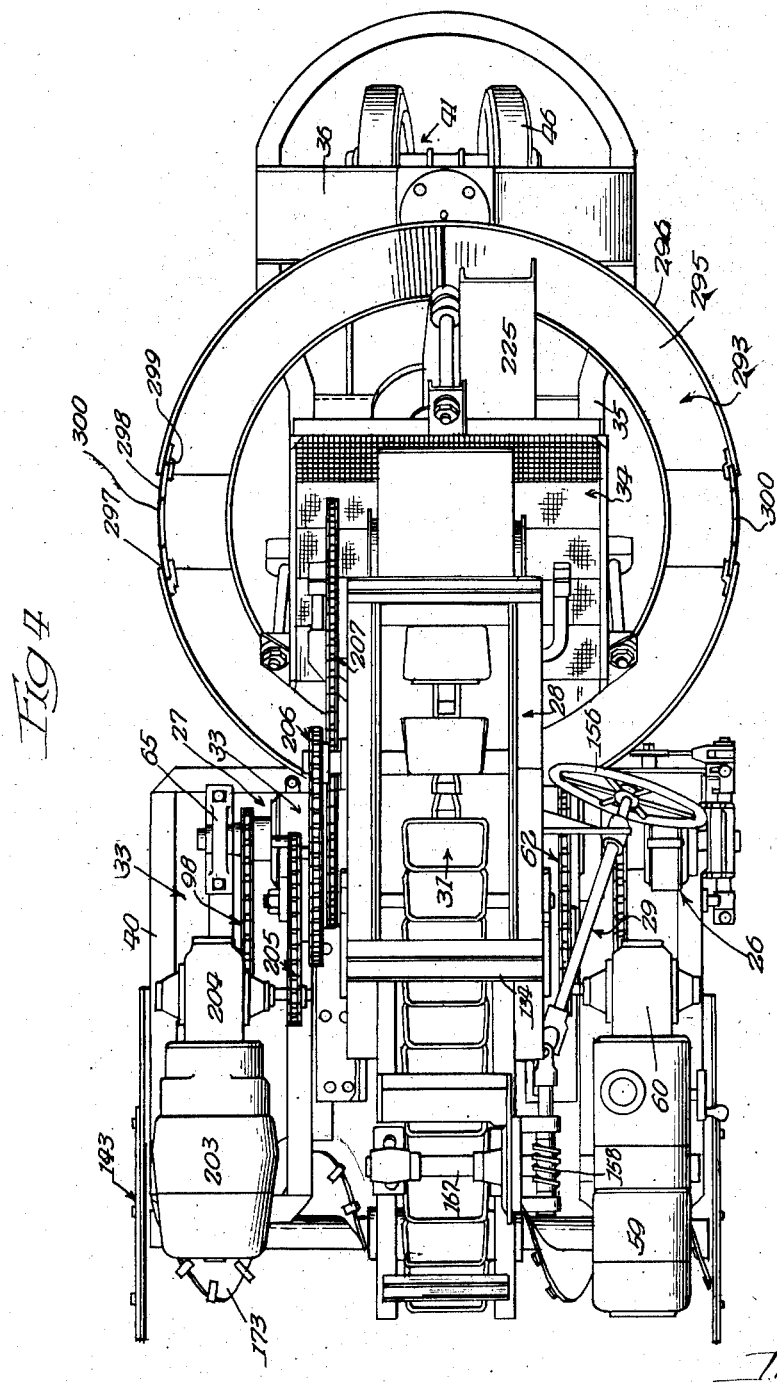

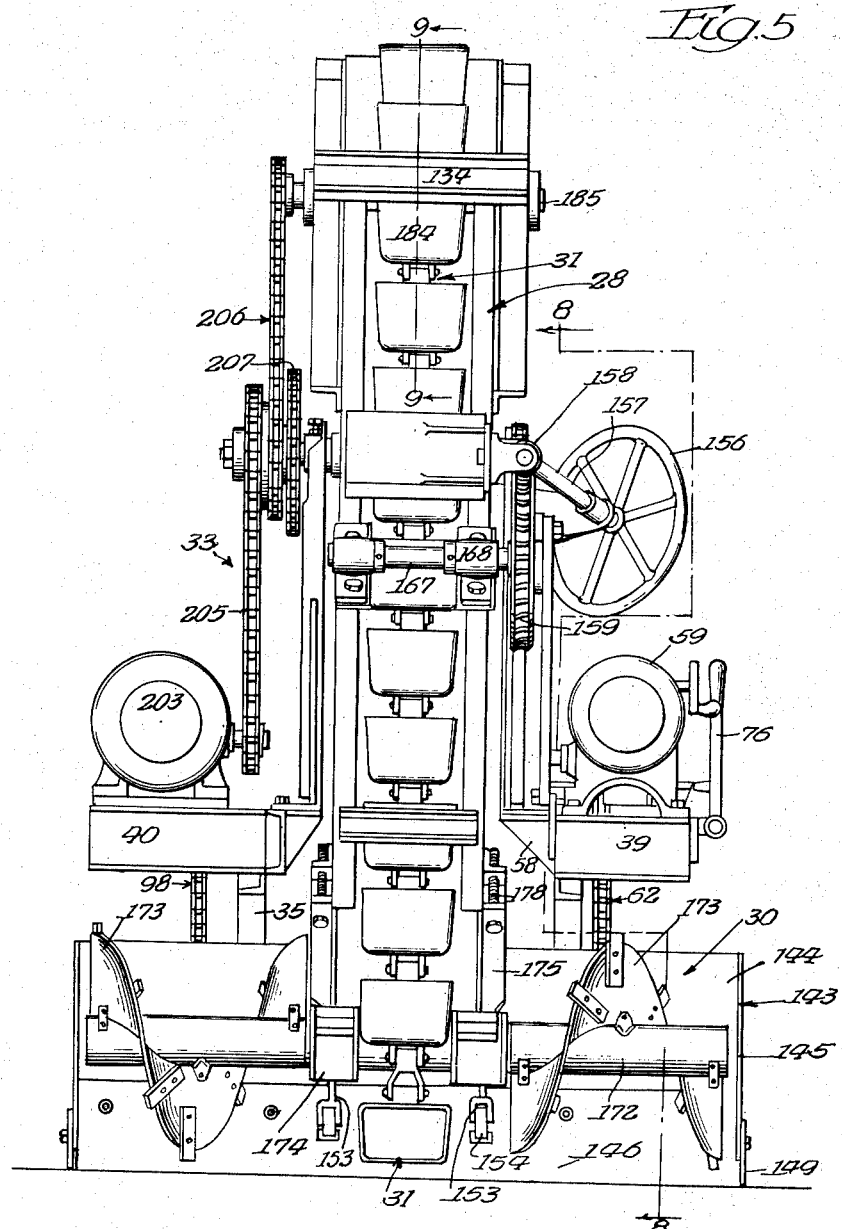

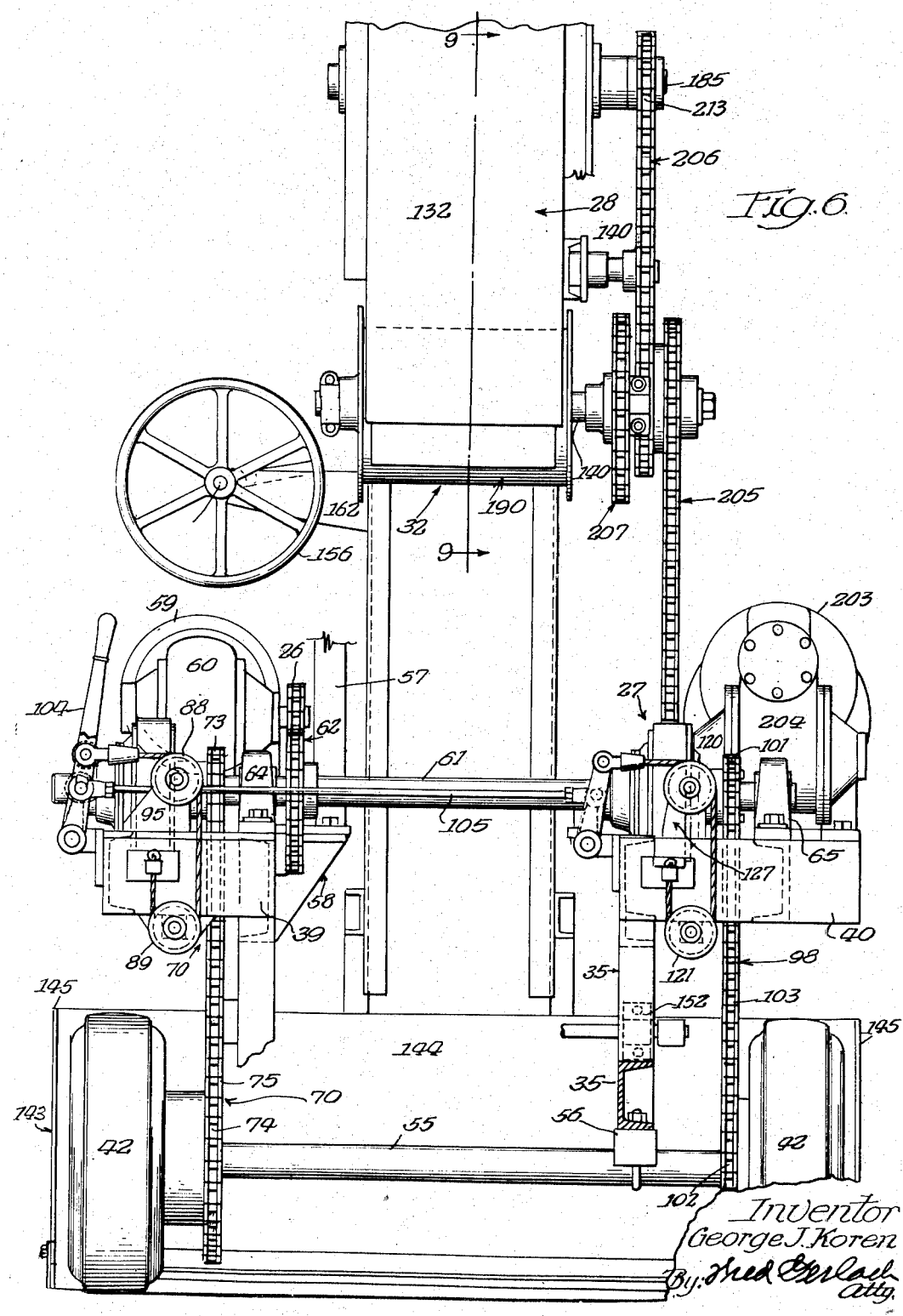

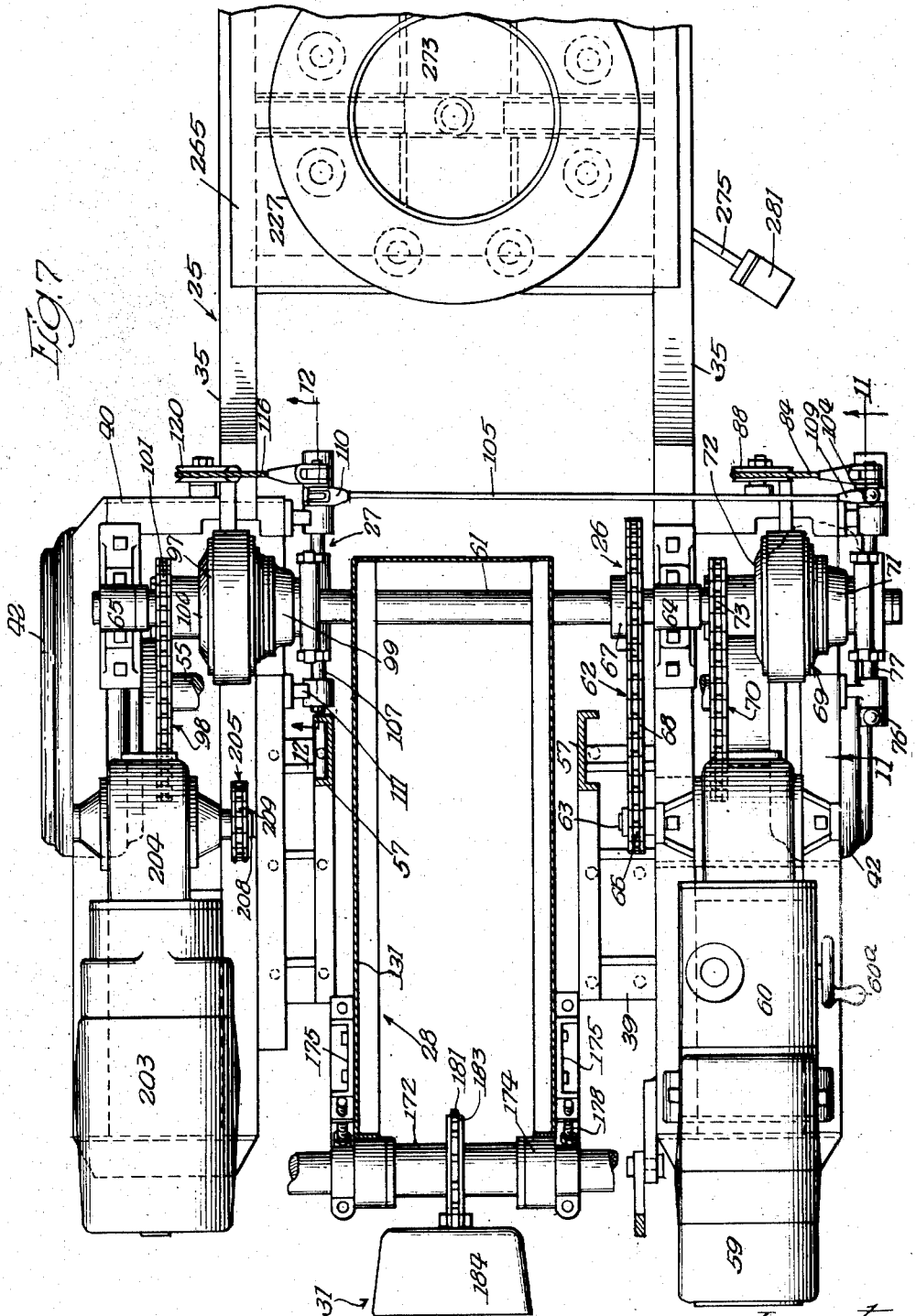

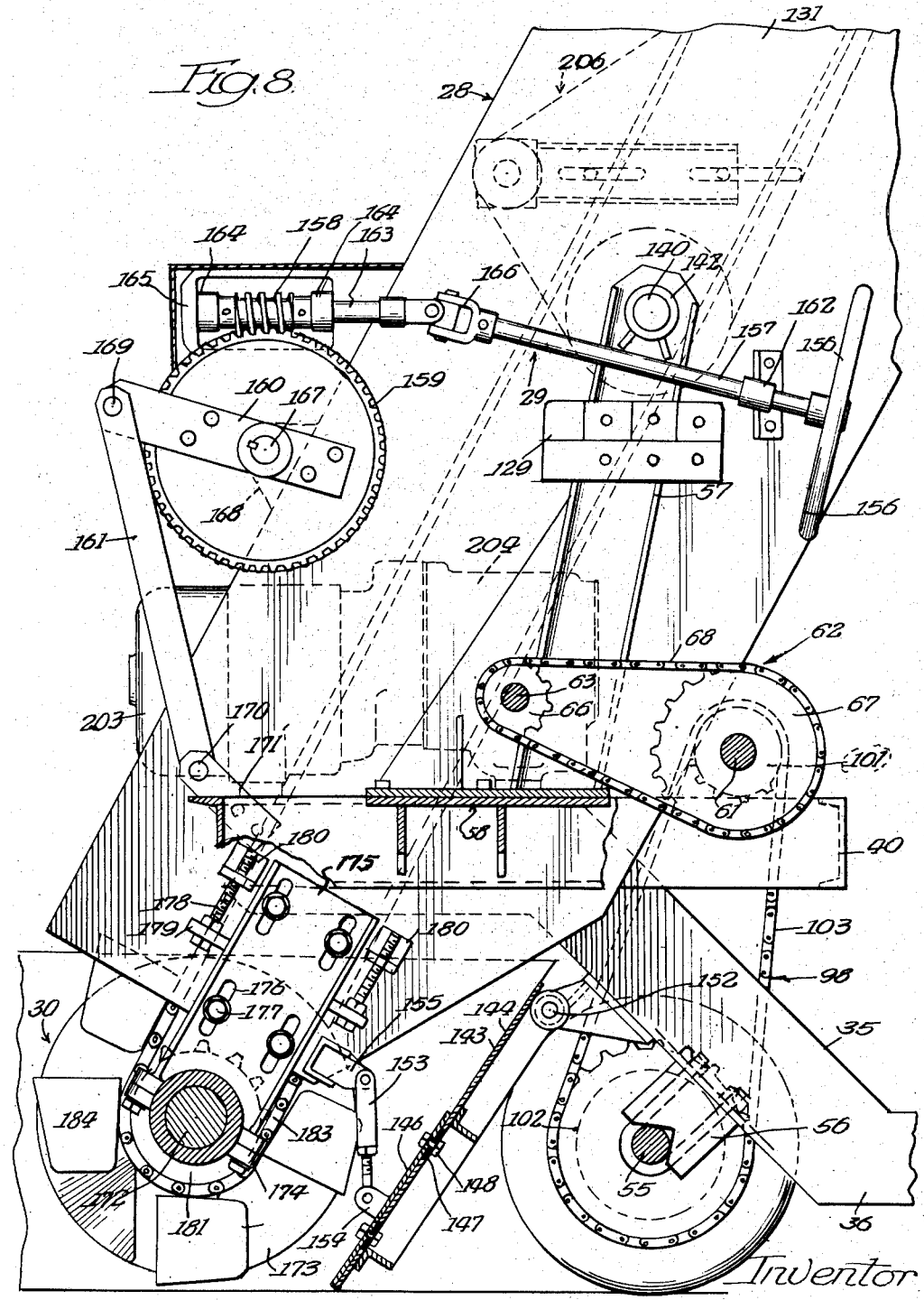

Sept. 1, 1953 G. J. KOREN 2,650,396
SAND HANDLING APPARATUS
Filed April 8, 1949 16 Sheets-Sheet 9
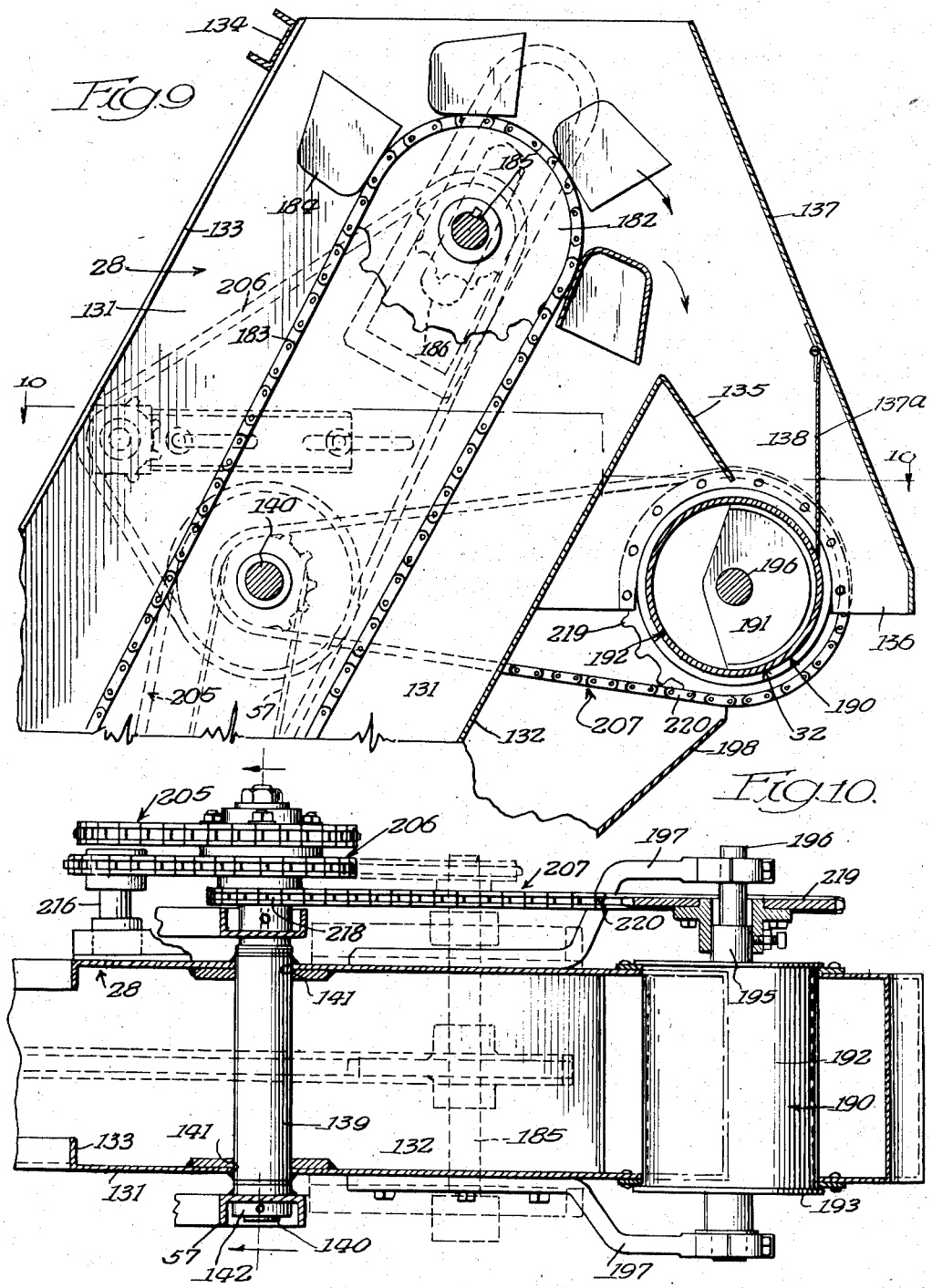

Sept. 1, 1953 G. J. KOREN 2,650,396
SAND HANDLING APPARATUS
Filed April 8, 1949 16 Sheets-Sheet 10
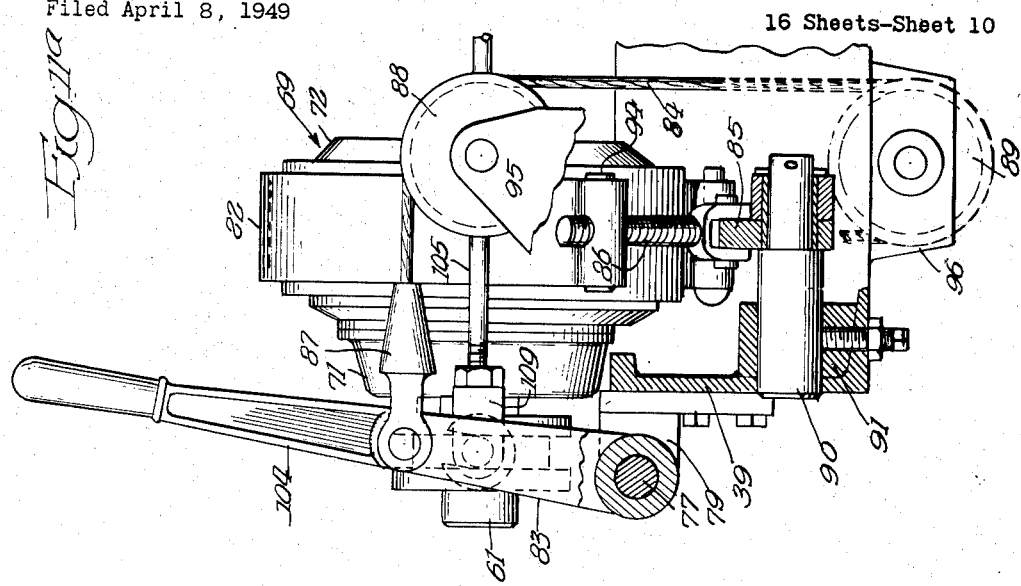
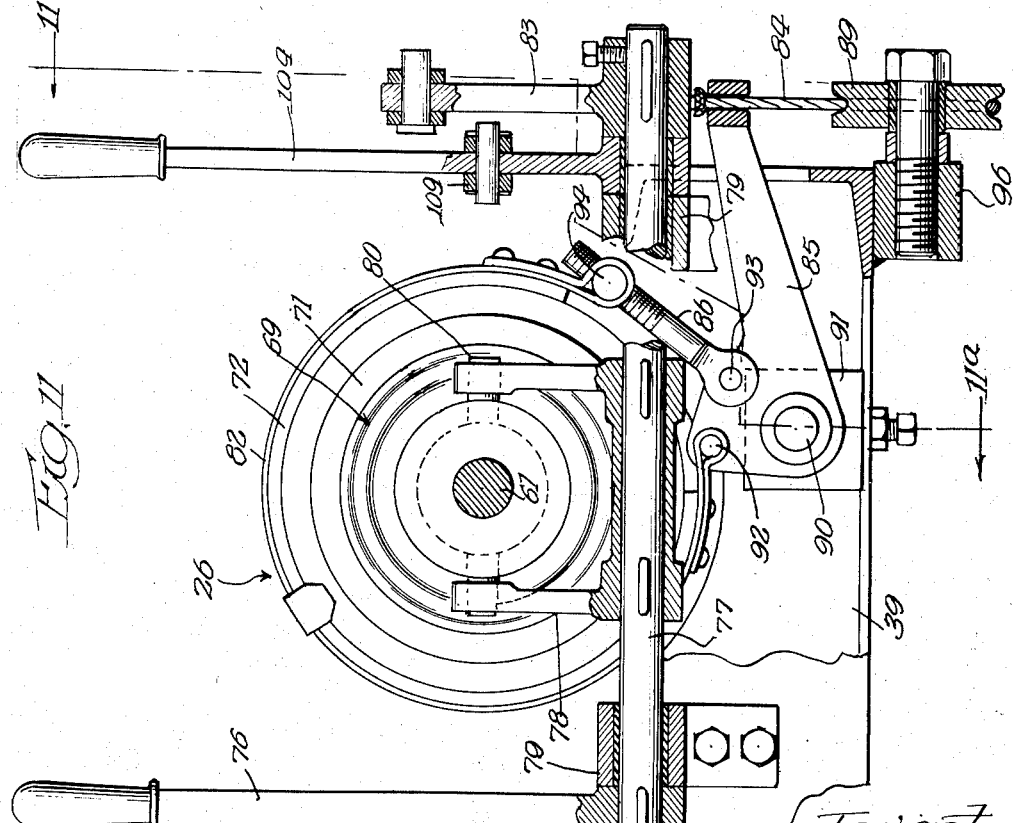
Inventor
George J. Koren
By: Fred Gerlach atty

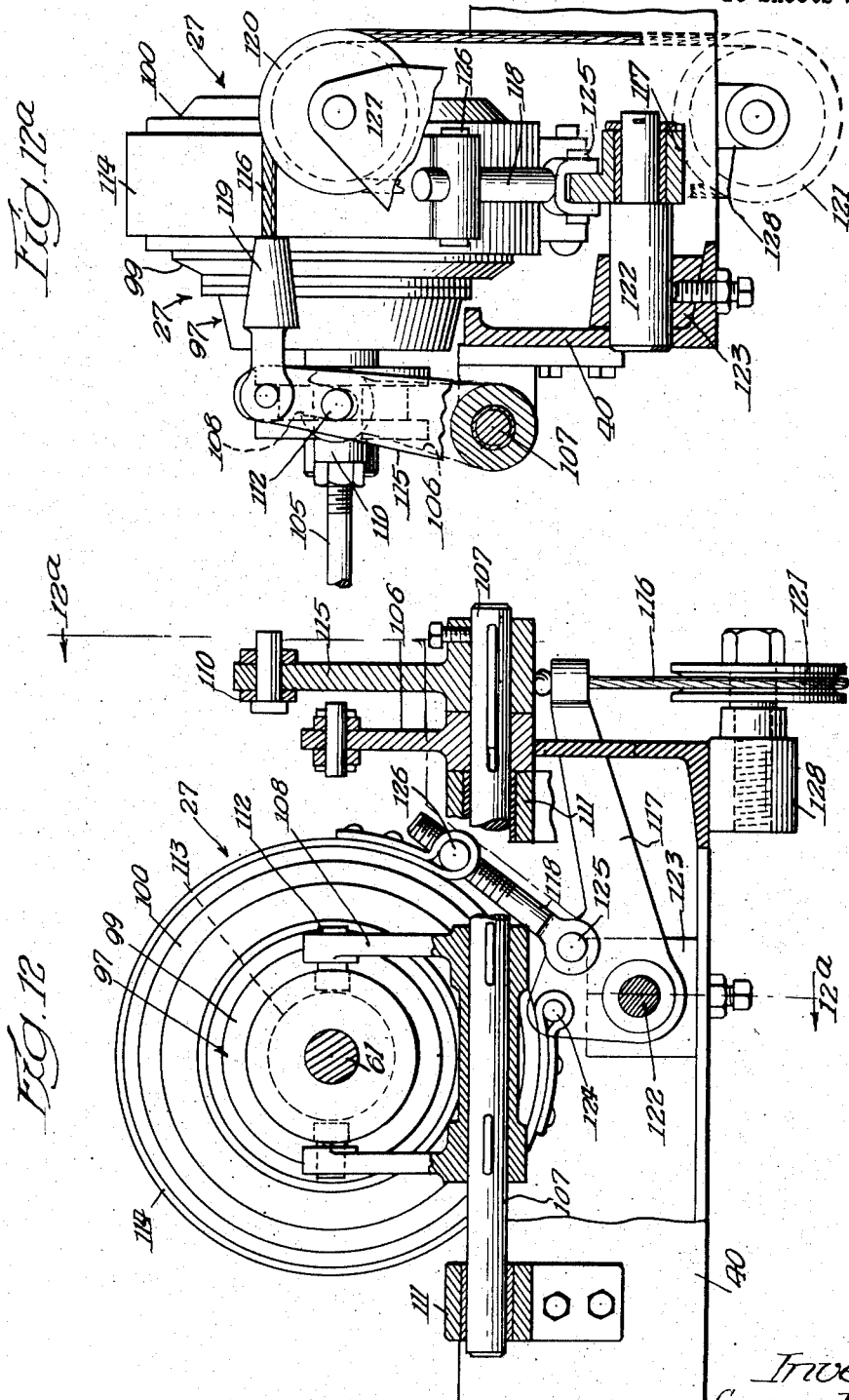

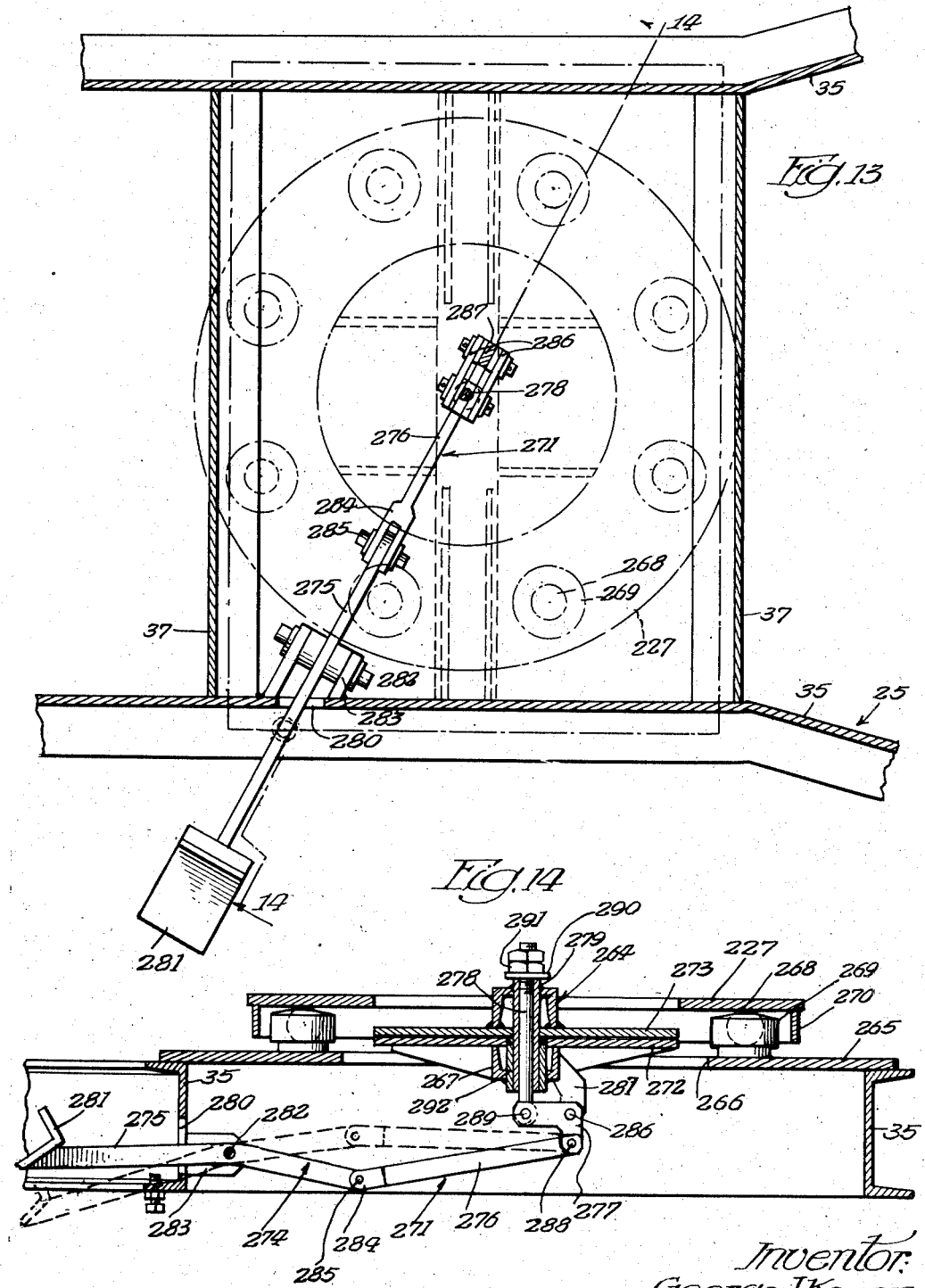

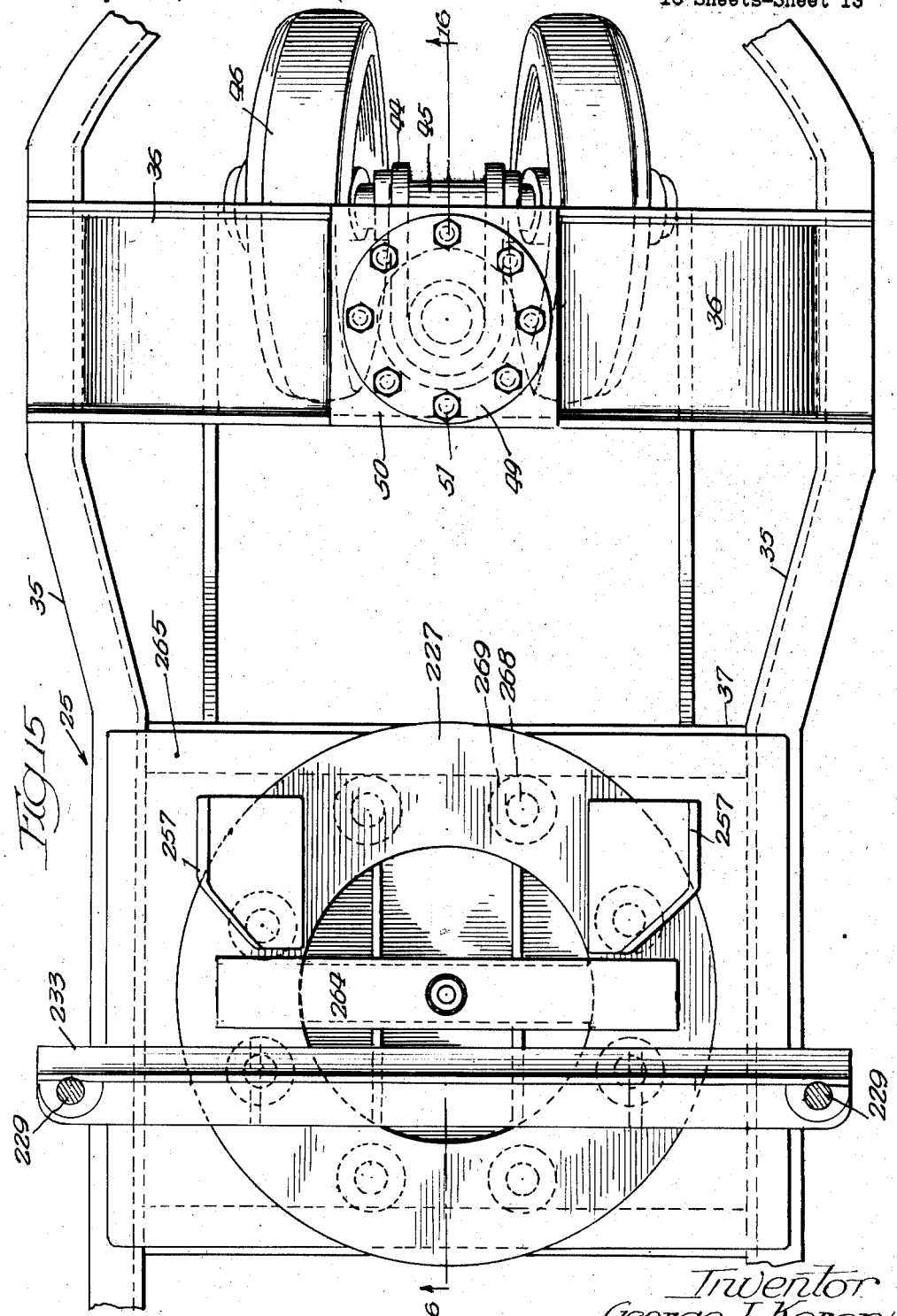

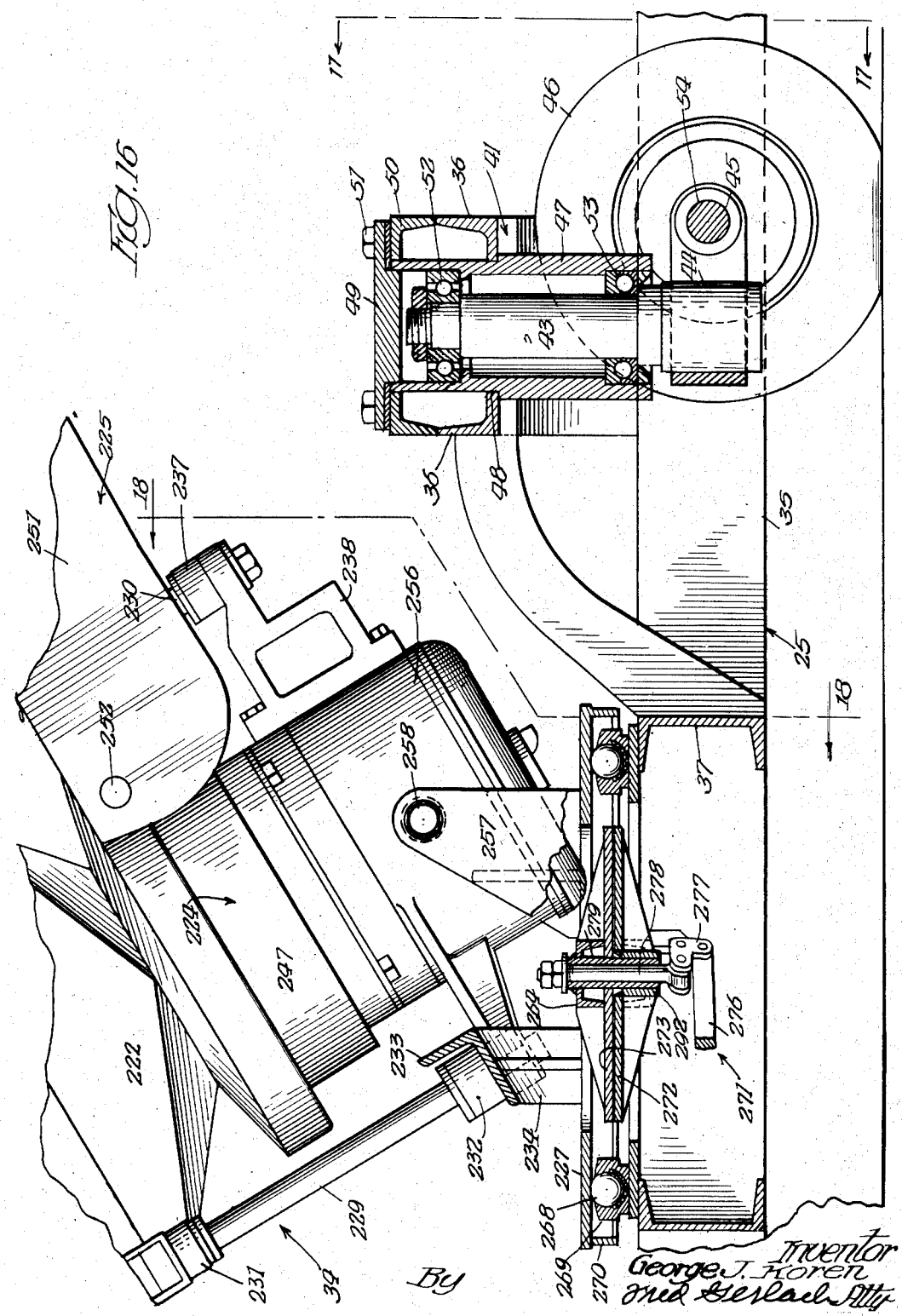

Sept. 1, 1953 G. J. KOREN 2,650,396
SAND HANDLING APPARATUS
Filed April 8, 1949 16 Sheets-Sheet 15
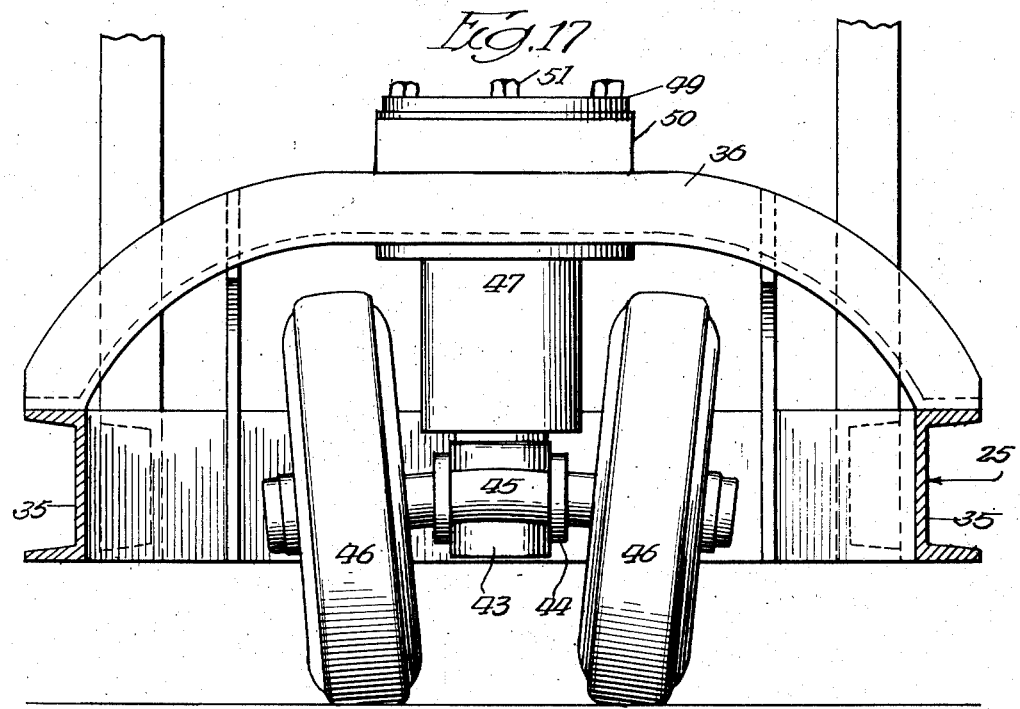
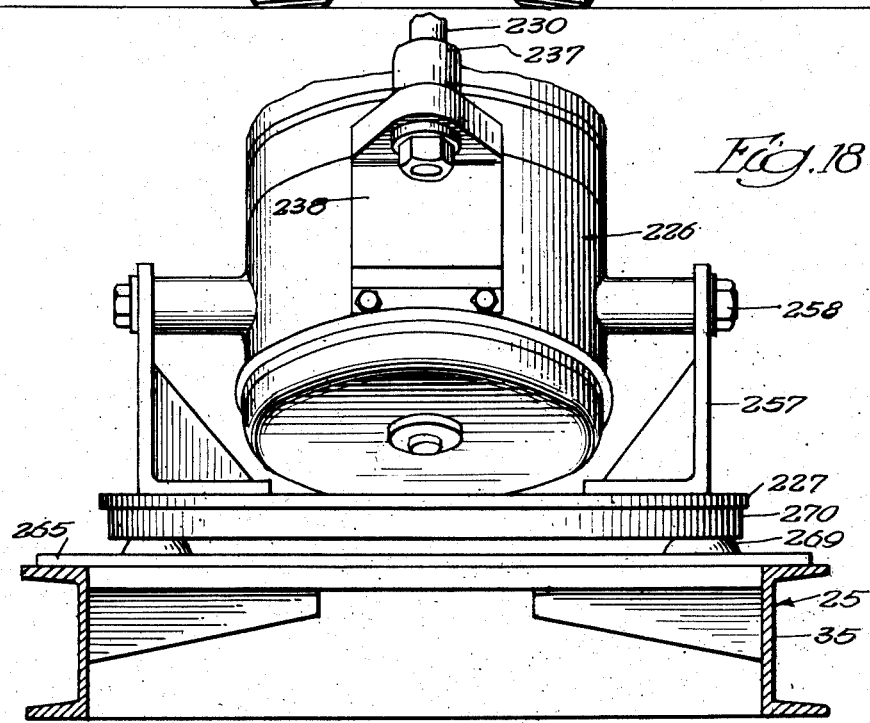
Inventor:
George J. Koren
By [signature] Atty Sept. 1, 1953 G. J. KOREN 2,650,396
SAND HANDLING APPARATUS
Filed April 8, 1949 16 Sheets-Sheet 16

Inventor
George J. Koren
By: Fred Gerlach
Atty

UNITED STATES PATENT OFFICE 2,650,396

SAND HANDLING APPARATUS

George J. Koren, Chicago, Ill., assignor to Pettibone Mulliken Corporation, Chicago, Ill., a corporation of Delaware Application April 8, 1949, Serial No. 86,342

14 Claims. (Cl. 22—89)

The present invention relates generally to apparatus for handling molding sand. More particularly the invention relates to that type of apparatus which is designed for use in a foundry, comprises a wheel equipped frame structure and operates when in use successively to accumulate, condition and discharge previously used molding sand preparatory to re-use.

One object of the invention is to provide an apparatus of this type which is an improvement upon, and has certain inherent advantages over, previously designed apparatus of the same general character and is characterized by the fact that it has greater capabilities of use, possesses extremely high efficiency and when in use may be controlled or operated so that it discharges the sand to form either a windrow or a pile.

Another object of the invention is to provide a sand handling apparatus of the type and character under consideration which comprises in addition to the wheel equipped frame structure a self-contained motor driven unit which is positioned at the rear end of the frame structure, serves to screen and aerate the sand and also to discharge the sand in stream form, embodies a gyratory screen, a blade equipped rotor beneath the screen, a housing around the rotor and a discharge spout on the housing, and is mounted on the frame structure so that it is bodily rotatable about a vertical axis to the end that the discharge spout on its housing may be positioned so as to discharge the stream of sand in any desired direction.

Another object of the invention is to provide a sand handling apparatus which embodies a motor driven horizontally disposed, rotary magnetic separator for ridding the sand of metallic objects before it is delivered to the gyratory screen of the self-contained screening, aerating and discharging unit.

Another object of the invention is to provide a sand handling apparatus of the last mentioned character in which the motor driven magnetic separator is located over the gyratory screen and receives sand by way of a motor driven horizontally disposed screw conveyor which is located at the front of the frame structure, embodies right and left spiral sections, and operates when the apparatus is propelled forwards to feed the sand on the foundry floor towards its central portion and also to blend new sand with used sand and wet sand with dry sand, and in addition a motor driven bucket elevator which rereceives the sand from the central portion of the screw conveyor and discharges it onto the separator.

Another object of the invention is to provide a sand handling apparatus of the type under consideration in which the screw conveyor has associated with it a plow for confining the sand during forward propulsion of the apparatus and the plow is so mounted that it may be swung upwards and downwards in order to adjust it with respect to the floor of the foundry.

Another object of the invention is to provide a sand handling apparatus of the type and character last mentioned in which the screw conveyor and the bucket elevator are carried by an upwardly extending hollow column which is tiltably mounted on the front end of the frame structure in order that it may be so angularly adjusted as to position the screw conveyor at different distances from the floor of the foundry.

Another object of the invention is to provide a sand handling apparatus of the character heretofore described in which the upwardly extending hollow column which carries the screw conveyor and the bucket elevator is tilted into different angular positions by way of irreversible gearing including a hand wheel at one side of the frame structure.

Another object of the invention is to provide a sand handling apparatus of the type under consideration in which the frame structure is supported for propulsion over the foundry floor by a double caster assembly at the rear end of the frame structure and two spaced apart coaxial wheels which are located at the front of the frame structure and have associated therewith motor actuated, reversible, selectively controllable driving mechanisms in order that the apparatus as a whole may be propelled forwards or backwards in a rectilinear course or turned in either direction.

Another object of the invention is to provide a sand handling apparatus of the last mentioned character in which the driving mechanisms for the front wheels are controlled selectively by two hand levers which are located at the same side of the frame structure as the hand wheel of the gearing for tilting the hollow column that carries the screw conveyor and the bucket elevator.

A further object of the invention is to provide a sand handling apparatus of the type and character under consideration which comprises an electric motor which is fixedly mounted on one side of the frame structure and serves to drive the selectively controllable driving mechanisms for the front wheels, and in addition an electric motor which is fixedly mounted on the other side of the frame structure and is connected to drive the screw conveyor, the bucket elevator and the rotary magnetic separator.

A still further object of the invention is to provide a sand handling apparatus which is generally of new and improved construction, embodies a novel arrangement of parts and is so designed and constructed that it may be easily operated.

Other objects of the invention and the various advantages and characteristics of the present apparatus for handling molding sand will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a left hand front perspective view of a sand handling apparatus embodying the invention;

Figure 2 is a right hand rear perspective view of the apparatus;

Figure 3 is a left hand side elevation of the apparatus illustrating in detail the construction and design of the irreversible gearing for tilting the hollow column in order to raise or lower the screw conveyor with respect to the floor of the foundry in which the apparatus is employed;

Figure 4 is a plan view;

Figure 5 is a front view showing in detail the construction and design of the screw conveyor and the bucket elevator;

Figure 6 is a vertical transverse section taken on the line 6—6 of Figure 3;

Figure 7 is a horizontal section on the line 7—7 of Figure 3;

Figure 8 is a fragmentary, vertical, longitudinal section on the line 8—8 of Figure 5;

Figure 9 is an enlarged fragmentary vertical longitudinal section taken on the line 9—9 of Figure 5 and showing the upper end of the bucket elevator and the construction and design of the rotary magnetic separator;

Figure 10 is a horizontal section on the line 10—10 of Figure 9;

Figure 11 is an enlarged vertical longitudinal section taken on the line 11—11 of Figure 7 and illustrating in detail the construction and design of the selectively controllable driving mechanism for the left hand front wheel of the apparatus;

Figure 11a is a vertical transverse section on the line 11a—11a of Figure 11;

Figure 12 is an enlarged vertical longitudinal section taken on the line 12—12 of Figure 7 and illustrating in detail the construction and design of the selectively controllable driving mechanism for the right hand front wheel of the apparatus;

Figure 12a is a vertical transverse section on the line 12a—12a of Figure 12;

Figure 13 is an enlarged horizontal section taken on the line 13—13 of Figure 3 and illustrating in detail the construction and design of the foot controlled mechanism for releasably locking the self-contained screening, aerating and discharging unit in its various angularly adjusted positions;

Figure 14 is a vertical section on the line 14—14 of Figure 13;

Figure 15 is a horizontal section taken on the line 15—15 of Figure 3 and showing the construction of the rotatable mounting for the unit;

Figure 16 is a vertical longitudinal section on the line 16—16 of Figure 15;

Figure 17 is an enlarged vertical section taken on the line 17—17 of Figure 16 and illustrating the design and arrangement of the double caster assembly at the rear end of the frame structure of the apparatus;

Figure 18 is a vertical transverse section on the line 18—18 of Figure 16;

Figure 19:
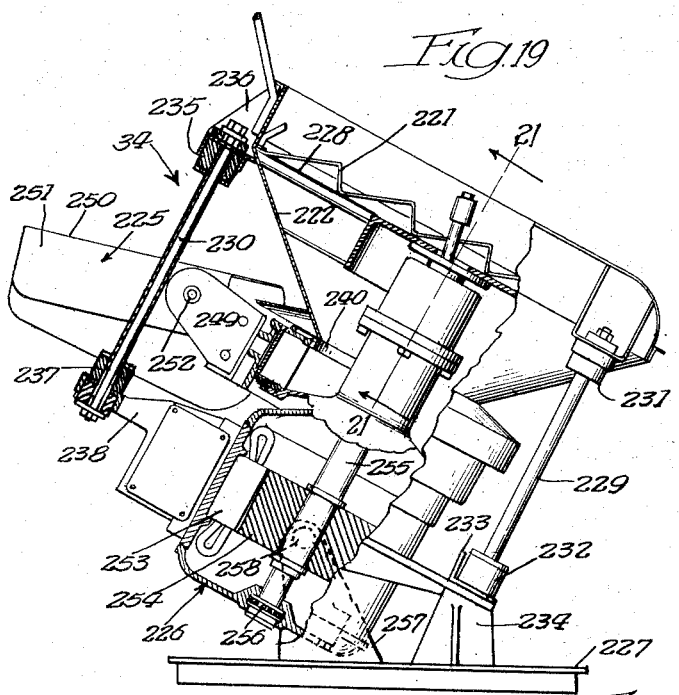
Figure 19 is a view partly in section and partly in elevation of the self-contained screening, aerating and discharging unit.
Figure 20:
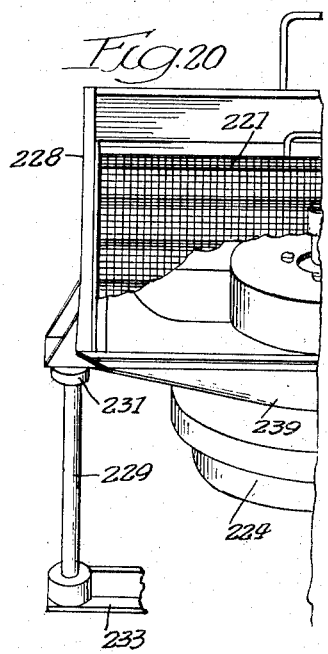
Figure 20 is a fragmentary elevation of the unit.
Figure 21:
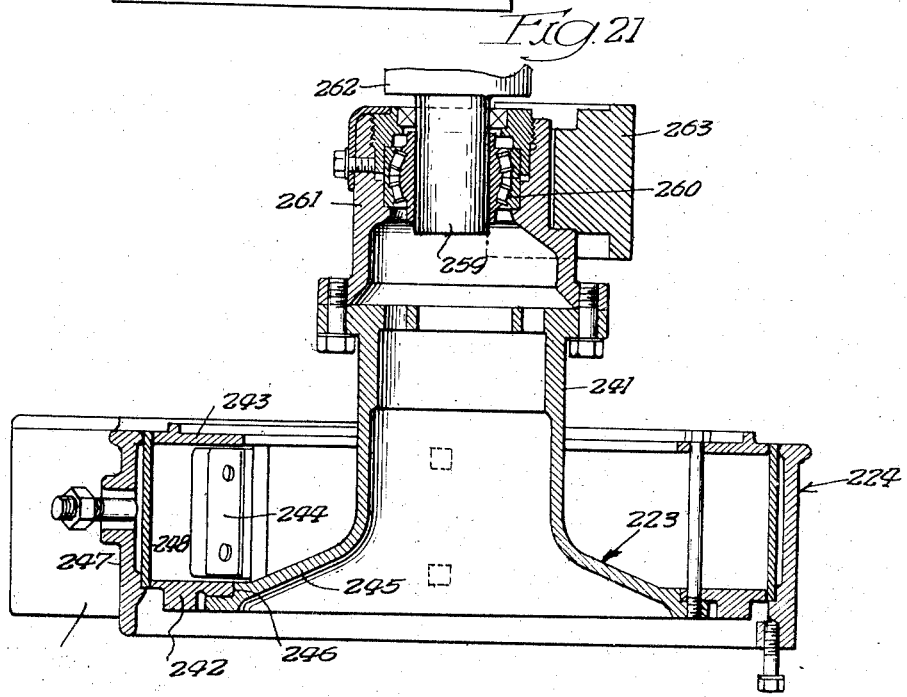
Figure 21 is a section taken on the line 21—21 of Figure 19 and illustrating the construction of the blade equipped rotor and the bearing and eccentric drive arrangement for gyrating the screen of the unit.

The apparatus which is shown in the drawings constitutes the preferred form or embodiment of the invention. It is designed for use in a foundry and serves as a medium or instrumentality for handling and conditioning previously used molding sand preparatory to re-use in flasks. In standard floor molding foundry practice the sand, after use, is shaken onto the floor of the foundry. It is then accumulated and subjected to screening in order to rid it of scrap and other foreign matter. The present apparatus, as hereinafter described more in detail, serves, first to elevate the sand from the foundry floor, then to rid the sand of metallic scrap, then to screen and remove non-metallic foreign matter, then to aerate the sand, and finally to discharge the sand so as to form either a windrow or a pile. As its principal parts or components the apparatus comprises a wheel equipped frame structure 25, motor actuated, selectively controllable mechanisms 26 and 27 for driving certain of the wheels of the frame structure in order to effect power propulsion of the apparatus as a whole, a pivotally mounted upwardly extending hollow column 28, irreversible gearing 29 for tilting or angularly adjusting the column, a screw conveyor 30, a bucket elevator 31, a rotary magnetic separator 32, motor actuated mechanism 33 for driving the screw conveyor, the bucket elevator and the magnetic separator, and a self-contained sand screening, aerating and discharging unit 34.

*Frame structure*

The frame structure 25 of the apparatus embodies a pair of spaced apart side beams 35, a crossbeam 36, a pair of crossbeams 37, a pair of crossbeams 38, a left hand platform 39, and a right hand platform 40. Preferably the beams are all channel beams. The side beams 35 are held in fixed and spaced apart relation by the aforementioned crossbeams and consist of horizontal low elevation rear ends, upwardly and forwardly inclined intermediate portions and horizontal high elevation front ends. The crossbeam 36 is arched or upwardly curved and has its ends welded to the outer extremities of the rear ends of the side beams 35. The side flanges of the crossbeam 36 extend upwards. The crossbeams 37 are located inwards of the crossbeam 35. They are spaced apart fore and aft and have the ends thereof welded to the adjacent portions of the rear ends of the side beams. The crossbeams 38 are spaced apart fore and aft and have their ends welded to the upwardly and forwardly inclined central portions of the side beams 35. The left hand platform 39 extends horizontally and is rectangular in form. It consists of welded together channel beams and is fixedly connected to, and projects outwards from, the front end of the left hand side beam. The other platform, i. e., the right hand platform 40, extends horizontally and, like the platform 39, is rectangular. It consists of welded together channel beams and is fixedly connected to, and projects outwards from, the front end of the right hand side beam. The rear end of the frame 25 is supported by a double caster assembly 41 and the front end of the frame is supported by a pair of wheels 42.

The double caster assembly 41 is located beneath, and connected to, the crossbeam 36 and consists of a vertically extending pintle 43, a horizontally extending U-shaped arm 44, an axle 45, and a pair of wheels 46. The pintle 43 extends into, and is in centered relation with, a vertically extending, open ended, tubular member 47, the central portion of which extends through a hole 48 in the central portion of the web of the crossbeam 36 and is welded in place. The upper end of the member 47 is closed by a circular cover plate 49 which is removably secured to a channel shaped bracket 50 by cap screws 51. The bracket surmounts and is welded to the central portion of the crossbeam 36 and has a central circular hole in alignment with the interior of the tubular member 47. The pintle 43 of the double caster assembly 41 is journaled in an upper ball bearing 52 and a lower ball bearing 53. The upper bearing extends between the upper ends of the pintle 43 and the tubular member 47 and the lower bearing extends between the central portion of the pintle and the lower end of the member 47. The horizontally extending arm 44 is fixedly connected to, and projects from, the lower end of the pintle 43 and has in its outer end a transverse hole 54 in which the central portion of the axle 45 is disposed. The wheels 46 have rubber tires and are rotatably mounted on the ends of the axle. As best shown in Figure 17 of the drawings, the ends of the axle are downwardly inclined in order that the wheels 46 are downwardly inclined towards one another. When the apparatus is propelled forward the arm 44 of the assembly assumes a trailing position, as shown in Figure 16, and when the apparatus is propelled rearwards the assembly 41 swings laterally throughout an arc of 180° into a position wherein the arm 44 extends towards the front of the frame structure.

The wheels 42 are located at opposite sides of the frame structure 25 and consists of hubs and rubber tires. They are disposed adjacent the upwardly and forwardly inclined intermediate portions of the side beams 35 and have the hubs thereof rotatably mounted on the ends of a horizontally extending axle 55. The latter is fixedly mounted in two bearing blocks 56 which are fixedly secured to, and project forwards and downwards from, the central parts of the intermediate portions of the side beams 35.

In addition to the parts heretofore mentioned the frame structure 25 comprises a pair of rearwardly inclined standards 57. These standards are located at the front end of the frame structure and have the lower ends thereof fixedly connected to the front ends of the side beams 35 by means of brackets 58. As shown in Figure 5 the brackets 58 project inwards from the front ends of the aforementioned side beams.

Selectively controllable wheel driving mechanisms

The selectively controllable mechanisms 26 and 27 are associated respectively with, and serve to drive, the left and right hand wheels 42. They are actuated by a reversible electric motor 59, a speed reducing unit 60, a shaft 61, and a sprocket and chain connection 62 between the unit 60 and the shaft 61. The electric motor 59 is fixedly secured to the front end of the platform 39 and is arranged so that the armature shaft thereof extends lengthwise of the frame structure 25. The speed reducing unit 60 is mounted on the platform 39 directly behind the reversible electric motor 59 and embodies a drive shaft (not shown) and a horizontal driven shaft 63. It is of the variable type and may be controlled for speed varying purposes by way of a rotary hand wheel 60a. When the hand wheel is turned in one direction the speed of the driven shaft 63 is increased and when the wheel is turned reversely the speed of the driven shaft is decreased. It is contemplated that the speed reducing unit 60 will be so designed and constructed that the speed of drive of the apparatus may be varied from 4½ feet per minte to 36 feet per minute. The drive shaft of the unit is coupled to the rear end of the armature shaft of the motor to the end that the unit is driven by the motor. The driven shaft 63 is located at the rear end of the unit 60 and extends transversely of the frame structure 25. The shaft 61 is disposed rearward of the speed reducing unit 60 and is in parallel relation with the driven shaft 63. It overlies the rear ends of the platforms 39 and 40 and is journalled in a pair of bearings 64 and 65. The bearing 64 is disposed inwards of the left hand end of the shaft 61 and is fixedly secured to, and projects upwards and rearwards from, the intermediate portion of the left hand side beam of the frame structure. The bearing 65 is located at the right hand end of the shaft 61 and is fixedly secured to the rear end of the platform 40, as best shown on Figure 7. The ends of the shaft 61 project beyond the side beams 35 of the frame structure 25. The sprocket and chain connection 62 consists of a sprocket 66, a sprocket 67, and an endless chain 68. The sprocket 66 is keyed or otherwise fixedly secured to the inner end of the driven shaft 63 of the unit 60. The sprocket 67 is keyed to the shaft 61 at a point directly inwards of the bearing 64 and lies in the same plane as the sprocket 66. The chain 68 extends around the two sprockets and serves to drive the sprocket 67 from the sprocket 66.

The driving mechanism 26 comprises a clutch 69 and a sprocket and chain connection 70. The clutch 69 is mounted on the left hand end of the shaft 61 and consists of a drive member 71 and a driven member 72. The drive member 71 is connected to the left hand end of the shaft 61 by a key or spline (not shown) in order that it is slidable axially or lengthwise of the shaft while at the same time it is driven conjointly with the shaft. The driven member 72 of the clutch 69 is disposed directly inwards of the drive member 71 and is mounted loosely on the shaft 61. The sprocket and chain connection 70 comprises a sprocket 73, a sprocket 74 and an endless chain 75. The sprocket 73 is fixedly secured to the inner end of the hub part of the driven member 72 of the clutch 69 and the sprocket 74 is fixedly secured to the inner portion of the hub of the left hand wheel 42. The endless chain 75 surrounds the two sprockets 73 and 74 and serves to connect them together for conjoint drive. When the drive member 71 of the clutch 69 is shifted inwards into clutched relation with the driven member 72 the left hand wheel 42 is connected for drive by the electric motor 59. When the motor is driven in one direction while the drive and driven members of the clutch 69 are in clutched relation the left hand wheel 42 is driven so as to effect forward propulsion of the apparatus and when the motor is reversely driven while the drive member 71 of the clutch 69 is in clutched relation with the driven member 72 the left hand wheel is driven in the opposite direction and effects rearward propulsion of the apparatus. The drive member 71 of the clutch is slid inwards and outwards into and out of clutched relation with the driven member 72 by way of an upstanding lever 76, a horizontal shaft 77, and an upstanding fork shaped member 78. The shaft 77 extends lengthwise of the frame structure 25. It underlies the left hand end of the shaft 61 and is journalled in a pair of spaced apart bearing brackets 79. The latter are bolted, or otherwise fixedly secured to, the outer part of the rear end of the platform 39. The lever 76 has the lower end thereof keyed or otherwise fixedly secured to the front end of the shaft 77 and embodies a handle at its upper end. The upstanding fork shaped member 78 is fixedly connected to the central portion of the shaft 77 and has at the upper ends of its arms notches in which are seated the outer ends of aligned horizontal pins 80. The inner ends of these pins are connected to a part of the drive member 71 of the clutch 69. When the lever 76 is swung inwards it operates through the medium of the shaft 77 and the fork shaped member 78 to slide the drive member 71 of the clutch 69 into clutched relation with the driven member and when the lever is swung outwards it serves to slide the drive member of the clutch out of clutched relation with the driven member 72. In order to brake the left hand wheel 42 and hold it against turning a brake is provided. The latter is in the form of a brake band 82 which surrounds the driven member 72 of the clutch 69. When the band is contracted around the driven member 72 the latter is locked against rotation and hence holds the left hand wheel 42 against turning. The band 82 is operatively connected to the lever 76 so that it is contracted when the lever is swung outwards in order to shift the drive member of the clutch 69 out of clutched relation with the driven member. The means whereby the band is operatively connected to the lever 76 comprises an upstanding arm 83, a cable 84, a bell crank 85, and a bolt 86. The arm 83 has its lower end fixedly connected to the rear end of the shaft 77. One end of the cable 84 is connected to the upper end of the arm 83 by a coupling 87. The cable extends inwards from the arm 83, then extends part way around a sheave 88, then extends downwards, then extends half way around a sheave 89 and then extends upwards. The other end of the cable is suitably anchored to the outer end of one arm of the bell crank 85. The central portion of the bell crank is pivotally mounted on a horizontal pivot pin 90 which is fixedly connected to a bracket 91 on the rear end of the platform 39. The outer end of the other arm of the bell crank 85 is provided with a pair of laterally spaced horizontal pins 92 and 93. The pin 92 extends through a loop on one end of the brake band 82 and the pin 93 serves as a pivot for the head of the bolt 86. As shown in Figure 11 the head of the bolt 86 is forked. The shank of such bolt extends through a threaded hole in a pin 94 which, as shown in Figures 11 and 11a, is disposed within a loop on the other end of the brake band. The sheave 88 is rotatably supported by way of a bracket 95 which, as shown in Figure 6, is connected to, and extends upwards from, the rear end of the platform 39. The other sheave, i. e., the sheave 89, is located directly beneath the sheave 88 and is rotatably supported by a bracket 96 which is connected to, and projects downwards from, the rear end of the platform 39. When the lever 76 is swung outwards it operates through the medium of the shaft 77, the arm 83, the cable 84, the bell crank 85 and the bolt 86 to contract the band 82 around the driven member 72 of the clutch 69. When the lever 76 is swung inwards the tension on the cable 84 is released with the result that the brake band 82 expands and thus releases the driven member 72 of the clutch and frees the left hand wheel 42 for turning about the axle 55.

The driving mechanism 27 for the right hand wheel 42 is similar in construction and mode of operation to the mechanism 26 for driving the left hand wheel. It comprises a clutch 97 and a sprocket and chain connection 98. The clutch 97 is mounted on the right hand end of the shaft 61 and consists of a drive member 99 and a driven member 100. The drive member 99 is connected to the right hand end of the shaft 61 by a key or spline (not shown) in order that it is slidable axially or lengthwise of the shaft while at the same time it is driven conjointly with the shaft. The driven member 100 of the clutch 97 is disposed directly outwards of the drive member 99 and is mounted loosely on the shaft 61. It overlies the rear end of the platform 40 and is located inwards of the bearing 65. The sprocket and chain connection 98 comprises a sprocket 101, a sprocket 102 and an endless chain 103. The sprocket 101 is fixedly secured to the outer end of the hub part of the driven member 100 of the clutch 97 and the sprocket 102 is fixedly secured to the inner portion of the hub of the right hand wheel 42. The endless chain 103 surrounds the two sprockets 101 and 102 and serves to connect them together for conjoint drive. When the drive member 99 of the clutch 97 is shifted outwards into clutched relation with the driven member 100 the right hand wheel 42 is connected for drive by the electric motor 59. When the motor is driven in one direction while the drive and driven members of the clutch 97 are in clutched relation the right hand wheel 42 is driven so as to effect forward propulsion of the apparatus and when the motor is reversely driven while the drive member 99 of the clutch 97 is in clutched relation with the driven member 100 the right hand wheel is driven in the opposite direction and effects rearward propulsion of the apparatus. The drive member 99 of the clutch is slid outwards and inwards into and out of clutched relation with the driven member 100 by way of an upstanding lever 104, a horizontal tie rod 105, an upstanding arm 106, a horizontal shaft 107 and an upstanding fork shaped member 108. The lever 104 is disposed directly forwards of the arm 83 and has the lower end thereof mounted loosely on the rear end of the horizontal shaft 77. The upper end of the lever 104 is shaped to form a handle for gripping purposes. The horizontal tie rod 105 extends transversely of the frame structure 25 and is located a small distance above and a small distance behind the motor driven shaft 61. The left hand end of the tie rod is connected by a clevis 109 to the central portion of the upstanding lever 104. The other end of the tie rod, i. e., the right hand end, is connected by a clevis 110 to the upper end of the arm 106. The lower end of such arm is keyed to the rear end of the shaft 107. The latter extends lengthwise of the frame structure 25 and is journaled in bearings 111 which are connected to, and project inwards from, the rear end of the platform 40. The upstanding fork shaped member 108 is keyed or otherwise fixedly connected to the central portion of the shaft 107 and has at the upper ends of its arms horizontal notches in which are seated the outer ends of a pair of aligned pins 112. The inner ends of these pins are connected to a part of the drive member 99 of the clutch 97. When the lever 104 is swung inwards it operates, through the medium of the tie rod 105, the arm 106, the shaft 107 and the fork shaped member 108, to slide the drive member 99 of the clutch 97 into clutched relation with the driven member 100 and when the lever is swung outwards it serves to slide the drive member 99 of the clutch inwards out of clutched relation with the driven member 100. In order to brake the right hand wheel 42 and hold it against turning a brake is provided. The latter is in the form of a brake band 114 which surrounds the driven member 100 of the clutch 97. When the band is contracted around said driven member the latter is locked against rotation and hence holds the right hand wheel 42 against turning. The band 114 is operatively connected to the shaft 107 so that it is contracted when the shaft is turned as the result of outward swinging of the lever 104 in connection with shift of the drive member 99 of the clutch 97 out of clutched relation with the driven member 100. The means whereby the band 114 is operatively connected to the shaft 107 comprises an upstanding arm 115, a cable 116, a bell crank 117 and a bolt 118. The arm 115 is disposed directly rearwards of the arm 106 and has its lower end keyed to the rear end of the shaft 107. One end of the cable 116 is connected to the upper end of the arm 115 by a coupling 119. The cable 116 extends outwards from the arm 115, then extends part way around a sheave 120, then extends downwards, then extends half way around a sheave 121 and then extends upwards. The other end of the cable 116 is suitably anchored to the outer end of one arm of the bell crank 117. The central portion of the bell crank 117 is pivotally mounted on a horizontal pivot pin 122 which is fixedly connected to a bracket 123 on the rear end of the platform 40. The outer end of the other arm of the bell crank 117 is provided with a pair of laterally spaced horizontal pins 124 and 125. The pin 124 extends through a loop on one end of the brake band 114 and the pin 125 serves as a pivot for the head of the bolt 118. As shown in Figure 12 the head of the bolt is forked. The shank of such bolt extends through a threaded hole in a pin 126 which, as shown in Figures 12 and 12a, is disposed within a loop on the other end of the brake band 114. The sheave 120 is rotatably supported by way of a bracket 127 which, as shown in Figures 6 and 12a, is connected to, and extends upwards from, the rear end of the platform 40. The other sheave, i. e., the sheave 121, is located directly beneath, and in the same plane as, the sheave 120 and is rotatably supported by a bracket 128 which is connected to, and projects downwards from, the rear end of the platform 40. When the lever 104 is swung outwards it operates through the medium of the tie rod 105, the arm 106, the shaft 107, the arm 115, the cable 116, the bell crank 117 and the bolt 118, to contract the band 114 around the driven member 100 of the clutch 97. When the lever 104 is swung inwards the tension on the cable 116 is released with the result that the brake band 114 expands and thus releases the driven member 100 of the clutch 97 and frees the right hand wheel 42 for turning about the axle 55.

When it is desired to propel the apparatus forwards the electric motor 59 is driven in the proper direction and the two levers 76 and 104 are swung conjointly inwards. Inward swinging of the levers results in conjoint drive of the wheels 42. In order to propel the apparatus rearwards the electric motor 59 is reversed and then the two levers 76 and 104 are swung inwards. If it is desired to brake the apparatus both levers are swung outwards so as to contract the brake bands around the driven members of the clutches 69 and 97. To turn the apparatus to the left the lever 76 is swung outwards and the lever 104 is swung inwards. This results in the left hand wheel 42 remaining stationary and drive or propulsion of the right hand wheel. To turn or swing the apparatus to the right the lever 76 is swung inwards and the lever 104 is swung outwards. This results in the right hand wheel remaining stationary and the electric motor 59 driving the left hand wheel. By driving the electric motor 59 in one direction or the other and swinging the levers 76 and 104 the apparatus may be driven in any direction. The reversible electric motor 59 is controlled by a reversing switch which is supported by a switch box 129. The latter, as shown in Figure 1, is mounted on a bracket 130 over the speed reducing unit 60 in order that it is readily accessible by the apparatus operator who, in connection with operation of the apparatus, stands opposite the levers 76 and 104. It is contemplated that the apparatus will be propelled at a sufficiently slow speed to enable the operator to walk at the side of the apparatus while gripping the handles on the levers 76 and 104.

*Hollow column*

The hollow column 28 extends upwards and rearwards from the front end of the frame structure 25 and serves as a combined supporting and housing medium for the screw conveyor 30, the bucket elevator 31 and the magnetic separator 32. It is essentially a rigid unit and comprises a pair of similarly shaped, laterally spaced side walls 131 and a rear wall 132. The front margins of the side walls have integral, inwardly extending flanges 133 that are cross connected by horizontally extending channel beams 134, the ends of which are welded or otherwise fixedly secured to the flanges 133. The lower ends of the sides 131 are disposed between, and spaced inwards of, the front ends of the side beams 35 of the frame structure 25. The rear wall of the column 28 extends between, and is connected to, the rear margins of the side walls 131. The upper end of the rear wall 132 is bent rearwards and downwards to form an extension 135 and this together with rearwardly extending extensions 136 on the upper ends of the side walls 131 and a downwardly and rearwardly inclined plate 137 defines a downwardly facing discharge chute 138. The plate 137 extends between, and is connected to, the rear margins of the extensions 136. The column is mounted by way of a sleeve 139 and a horizontal shaft 140 so that it is capable of tilting lengthwise of the frame structure 25 in order to vary the position of its lower end with respect to the floor of the foundry in which the apparatus is utilized. The sleeve 139 extends horizontally and is loosely mounted on the central portion of the shaft 140. It extends transversely across the central portion of the column 28 and has its ends extending through aligned holes 141 in the central portions of the side walls 131 of the column and welded to the parts of the side walls that define said holes. The shaft 140 extends through, and is fixed to, bearing type brackets 142 which, as shown in Figures 1, 3, 8 and 10, are fixedly connected to the upper ends of the standards 57 of the frame structure 25. When the apparatus, after use, is propelled to its place of storage it is contemplated that the hollow column 28 will be tilted in a clockwise direction as viewed in Figures 1, 3 and 8 in order to raise it a sufficient distance above the foundry floor to prevent it from contacting obstacles. In connection with use of the apparatus the column is tilted in a counterclockwise direction in order to position the lower end of the column at the proper elevation.

The lower end of the hollow column 28 has associated with it a comparatively wide plow 143 for confining the sand on the foundry floor during forward propulsion of the apparatus. This plow surrounds the screw conveyor 30 and consists of an upwardly and rearwardly inclined back wall 144 and a pair of side walls 145. The back wall 144 of the plow underlies the front end of the side beams 35 of the frame structure 25 and embodies at its bottom portion a wear plate 146. The latter is adjustable upwards and downwards with respect to the bottom portion of the back wall 144 by way of connections consisting of slots 147 and bolts 148. The slots 147 are formed in the bottom portion of the plow back wall 144 and the bolts 148 extend through the slots and also through holes in the wear plate 146. When the nuts on the bolts are loosened the wear plate 146 may be adjusted upwards or downwards with respect to the bottom portion of the back wall 144. The side walls 145 of the plow are fixedly connected to, and extend forwards from, the ends of the back wall 144 and have at their bottom portions wear plates 149. The latter are secured in place by slot and bolt connections in order that they may be adjusted upwards and downwards relatively to the plow side walls. The last mentioned connections consist of vertically extending slots 150 in the wear plates 149 and bolts 151 which extend through the slots 150 and also through holes in the bottom parts of the side walls 145 of the plow. The top portion of the back wall of the plow is connected to the upper ends of the intermediate portions of the side beams 35 by a pair of hinges 152 in order that the plow as a whole is capable of being swung upwards and downwards. A pair of upstanding turnbuckles 153 serves operatively to connect the plow to the lower end of the hollow column 28. The lower ends of the turnbuckles are pivotally connected to brackets 154 on the bottom portion of the plow back wall 144 and the upper ends of the turnbuckles are pivotally connected to brackets 155 on the lower ends of the side walls 131 of the hollow column 28. By adjusting the length of the turnbuckles 153 the plow may be swung upwards or downwards relatively to the lower end of the column in order to vary its position with respect to the foundry floor. The turnbuckles, however, connect the plow to the lower end of the column so that it swings upwards and downwards in response to tilting of the column. If, when the column is in its normal or operating position, it is desired to raise the plow with respect to the floor the turnbuckles 153 are shortened. Lengthening of the turnbuckles serves to lower the plow with respect to the floor of the foundry.

*Irreversible gearing for tilting the hollow column*

The irreversible gearing 29 for tilting the hollow column 28 comprises a hand wheel 156, a shaft 157, a worm 158, a worm wheel 159, an arm 160 and a link 161. The hand wheel 156 is located at the left hand side of the apparatus and overlies the levers 76 and 104 in order that it is conveniently located for turning by the operator of the apparatus. The shaft 157 extends lengthwise of the frame structure and is located outwards of the upper end of the left hand standard 57. It is journalled in a bearing 162 on the left hand side wall 131 of the hollow column 28 and has the hand wheel 156 connected fixedly to its rear end. The worm 158 is mounted on a horizontal shaft 163 which extends lengthwise of the frame structure 25 and is journalled in bearings 164 on a bracket 165. Such bracket is connected to the central portion of the left hand side wall of the column 28. The rear end of the shaft 163 is connected to the front end of the shaft 157 by a universal joint 166. The worm wheel 159 underlies, and is in mesh with, the worm 158 and is fixedly connected to one end of a horizontal shaft 167. The shaft 167 extends transversely of the frame structure 25 and is journalled in bearings 168 which are mounted on the intermediate portions of the flanges 133 on the front margins of the side walls 131 of the hollow column 28. The arm 160 is fixedly connected to, and projects forwards from, the worm wheel 159. The link 161 depends from the outer end of the arm 160. A pivot pin 169 serves pivotally to connect the upper end of the link 161 to the outer end of the arm 160. The lower end of the link is pivotally connected by a pin 170 to a bracket 171 which is fixedly connected to the front end of the platform 39. When the hand wheel 156 is turned so that the worm 158 operates to turn the worm wheel 159 in a counterclockwise direction as viewed in Figure 8 the worm wheel operates through the medium of the arm 160 and the link 161 to tilt the hollow column 28 in a clockwise direction thus causing raising of the plow 143 and the lower end of the column with respect to the floor of the foundry. Clockwise turning of the worm wheel 159 as viewed in Figure 8 results in counter-clockwise tilting of the column 28 and results in lowering of the plow and the lower end of the column. From the foregoing it is manifest that by turning the hand wheel 156 of the irreversible gearing 29 in one direction or the other the operator of the apparatus may tilt the hollow column 28 into or out of its operative position.

Screw conveyor

The screw conveyor 30 of the apparatus consists of a horizontally extending shaft 172 and a pair of spiral sections 173. The shaft 172 extends transversely of the frame structure 25 and is located between the side walls 145 of the plow 143. The central portion of the shaft is rotatably supported by way of two laterally spaced split bearings 174 which are fixedly connected to the lower ends of two upstanding channel beams 175. The upper ends of these channel beams fit against the outer surfaces of the lower ends of the side walls 131 of the hollow column 28 and are adjustably secured in place by means of connections in the form of slots 176 and bolts 177. The slots are formed in, and extend lengthwise of, the webs of the channel beams 175 and the bolts 177 extend through the slots and also through holes in the lower ends of the column side walls 131. When the bolts 177 are loosened the channel beams 175 may be slid upwards or downwards in order to adjust the position of the bearings 174 with respect to the lower end of the column 28. Shift of the channel beams 175, after loosening of the bolts 177, is effected by way of adjusting screws 178, the heads of which are connected rotatably to laterally extending brackets 179 on the upper ends of the side flanges of the channel beams 175, and the shanks of which extends through threaded holes in angle brackets 180 on the lower ends of the column side walls 131. The spiral sections 173 of the screw conveyor 30 extend around and are fixedly secured to the shaft 172. One of the sections has a right hand spiral and the other section has a left hand spiral. When the apparatus is in operation the screw conveyor 30 is driven in a clockwise direction as viewed in Figures 3 and 8. The spiral arrangement of the sections 173 is such that the sections, in connection with drive of the conveyor, operate to feed inwards toward the central portion of the shaft 172 the sand that is confined within the plow 143. The screw conveyor 30 serves not only to feed the sand on the foundry floor towards the central portion of the shaft, but also, by its agitating effect, to blend new sand with used sand and to mix wet sand with dry sand. When the apparatus is propelled forward the speed reducing unit 60 is controlled by proper manipulation of the hand wheel 60a so that the speed of the apparatus matches or harmonizes with the height of the sand on the foundry floor. If the height of the sand is comparatively high the apparatus will be driven at a slow speed so that the sand conveyor is operative to feed all of the sand that it encounters. On the other hand, if the height of the sand is comparatively small it is contemplated that the apparatus will be driven at a greater speed and this is accomplished by properly controlling the speed reducing unit 60 by turning of the hand wheel 60.

Bucket elevator

The bucket elevator 31 is disposed for the most part within the hollow column 28 and when in operation serves to elevate the sand at the central portion of the screw conveyor 30 and then to discharge the sand into the discharge chute 138. It is of standard or conventional design and consists of a pair of sprockets 181 and 182, an endless chain 183, and a series of buckets 184. The sprocket 181 is fixedly mounted on the central portion of the shaft 172 of the screw conveyor 30 and is located midway between the bearings 174. The sprocket 182 is fixedly secured to the central portion of a horizontal shaft 185, and is positioned between the upper ends of the sides 131 of the column 28. The ends of the shaft 185 extend through longitudinal slots 186 in the upper ends of the column side walls and are journalled in bearings 187. The latter are mounted for up and down sliding movement in guide frames 188 which, as best shown in Figures 1, 2 and 3, extend lengthwise of the column side walls 131 and are fixedly mounted against the outer surface of the upper ends of said side walls. Adjusting screws 189 serve to slide the bearings 187 with respect to the guide frames 188. These screws extend upwards through threaded holes in the lower ends of the guide frames and have the upper ends thereof operatively connected to the bearings 187. The endless chain 183 extends around the sprockets 181 and 182 and serves when the sprocket 182 is driven, as hereinafter described, to drive the screw conveyor 30 through the medium of the sprocket 181. The buckets 184 are spaced equidistantly apart and are suitably secured to certain of the links of the endless chain 183. They are arranged so that they face upwards when travelling in the front reach of the chain and face downwards when travelling in the rear reach of the chain. In connection with operation of the apparatus the buckets pick up the sand as it is fed to the central portion of the screw conveyor 30 and then while passing around the sprocket 182 discharge the sand into the discharge chute 138. It is contemplated that the bucket elevator will be in operation when the apparatus is propelled forwards over sand on the foundry floor. Slack in the chain 183 of the bucket elevator is taken up by so manipulating the adjusting screws 189 as to effect raising of the bearings 187 for the ends of the sprocket carrying shaft 185.

Rotary magnetic separator

The rotary magnetic separator serves to rid the sand of foreign metallic objects as it passes through the discharge chute 138 preparatory to delivery to the screening, aerating and discharging unit 34. It consists of a horizontal rotary drum 190 and an electro-magnet 191 within the drum. The drum has a cylindrical side wall 192 and circular end walls 193 and is positioned directly beneath the lower end of the extension 135 on the upper end of the column rear wall 132. A gate 137a of brass or other non-magnetic material is hinged to the central portion of the rearwardly inclined plate 137 and serves to guide the sand towards the rear portion of the drum 190 to the end that any metallic material in the sand will adhere to the drum side wall when brought within the influence of the electro-magnet 191. As shown in Figure 7 the gate 137a is hinged at its upper end and is so positioned that its lower portion is normally in contact with the rear portion of the drum side wall 192. The upper portions of the ends of the side wall 192 of the drum fit within semi-circular cutout 194 in the lower portions of the extensions 136 on the upper ends of the column side walls 131. The end walls 193 are provided at the central portions thereof with outwardly extending tubular elements 195 and these are rotatably mounted on a stationary horizontally extending shaft 196.

As best shown in Figure 10, the ends of the shaft 196 are clamped to the rear ends of a pair of horizontally extending brackets 197. The front ends of such brackets are bolted or otherwise fixedly secured to the upper ends of the column side walls 131. When the apparatus is in operation the drum 190, as hereinafter described more in detail, is driven in a clockwise direction as viewed in Figure 9. The electro-magnet 191 is disposed in the rearmost part of the interior of the drum 190 and is in the form of a core and windings. It is fixedly mounted on the central portion of the stationary shaft 196 and extends throughout an arc of approximately 180°. In connection with operation of the separator the sand, after passing the extension 135, contacts the rear portion of the rotating drum 190 with the result that any metallic objects in the sand adhere to the drum due to the action of the magnet 191. The sand, because it is non-metallic, flows or passes downwards from the discharge chute 138 while the metallic objects rotate with the drum until they pass out of the influence of the magnet 191 at which time they drop downwards onto a chute 198. The latter is downwardly and forwardly inclined, is connected to the upper end of the hollow column 28 by brackets 199 and serves to discharge the separated metallic objects into a receptacle 200. The latter underlies the lower front end of the chute 198 and is removably mounted on a supporting frame 201 which, as best shown in Figure 2, is connected to, and projects rearwards from, the central portions of the column side walls 131. The receptacle 200 is accessible from either side of the apparatus and has at its ends handles 202 whereby it may be lifted from the supporting frame 201 when it is desired to discharge accumulated metallic objects which have been separated from the sand by the rotary magnetic separator 32.

*Mechanism for driving the screw conveyor, bucket elevator and magnetic separator*

The mechanism 33 for driving the screw conveyor 30, the bucket elevator 31 and the rotary magnetic separator 32 is located at the right hand side of the apparatus and comprises a unidirectional electric motor 203, a speed reducing unit 204, a sprocket and chain connection 205, a sprocket and chain connection 206, and a sprocket and chain connection 207. The electric motor 203 is mounted on the front end of the platform 40 and is arranged so that the armature shaft thereof extends lengthwise of the frame structure 25. The switch for controlling the motor is preferably mounted on the switch box 129 in order that it is readily accessible to the operator of the apparatus. The speed reducing unit 204 is mounted on the platform 40 directly behind the motor 203 and embodies a longitudinal drive shaft (not shown) and a transverse driven shaft 208. The drive shaft is suitably connected to the rear end of the armature shaft of the motor 203. The sprocket and chain connection 205 comprises a sprocket 209, a sprocket 210 and an endless chain 211. The sprocket 209 is keyed or otherwise fixedly secured to the inner end of the driven shaft 208 of the speed reducing unit 204. The sprocket 210 is disposed above the sprocket 209 and is loosely mounted on the right hand end of the shaft 140 which, as previously pointed out, forms, with the sleeve 139, the pivotal support or mount for the hollow column 28. The endless chain 211 extends around the two sprockets 209 and 210 and serves when the motor 203 is in operation to drive the sprocket 210 from the sprocket 209. The sprocket and chain connection 206 comprises a drive sprocket 212, a driven sprocket 213, an idler sprocket 214 and an endless chain 215. The drive sprocket 212 is directly connected to the inner end of the hub part of the sprocket 210 by a shear pin (not shown). It is contemplated that should the screw conveyor or the buckets encounter any object which would tend to stall the conveyor and bucket elevator the pin will shear and hence eliminate the possibility of damage to the electric motor 203 and the speed reducing unit 204. The driven sprocket 213 is keyed to the right hand end of the shaft 185 which, as shown in Figure 9, carries the sprocket 182 of the bucket conveyor. The idler sprocket 214 is located between, but forwards of, the sprockets 212 and 213 and is rotatably mounted on a horizontal spindle 216 which is connected to a bracket 217 on the right hand side wall 131 of the hollow column 28. The endless chain 215 surrounds the three sprockets 212, 213 and 214 and, in connection with drive of the sprocket 210 by the electric motor 203, effects drive of the driven sprocket 213 from the drive sprocket 212. Drive of the sprocket 213 results in operation or drive of the screw conveyor 30 and the bucket elevator 31. The sprocket and chain connection 207 serves to drive the drum 190 of the magnetic separator 32 and consists of a sprocket 218, a sprocket 219 and an endless chain 220.

The sprocket 218 is fixedly connected to the inner end of the hub part of the sprocket 212 of the sprocket and chain connection 206. The sprocket 219 is suitably fixed to the right hand end wall 193 of the magnetic separator drum 190. The endless chain 220 extends around the two sprockets 218 and 219. When the sprocket 218 is driven as the result of drive of the sprocket 210 by the electric motor 203 it serves, through the medium of the chain 220, to drive the sprocket 219 which, in turn, drives the drum of the magnetic separator 32. By having the mechanism 33 for driving the screw conveyor, the bucket elevator and the magnetic separator located at the right hand side of the apparatus and the levers 76 and 104 of the mechanisms 26 and 27 for driving the wheels 42 located at the left hand side of the apparatus there is no danger of the operator of the apparatus being injured by the motor actuated mechanism 33. In view of the fact that the sprocket 210 is mounted on the shaft 140 which is the articulation point of the hollow column 28 tilting of the column by the irreversible gearing 29 does not in any way affect the sprocket and chain connection 206 for driving the screw conveyor and the bucket elevator or the chain and sprocket connection 207 for driving the drum of the magnetic separator.

*Screening, aerating and discharging unit*

The unit 34 is located at the rear end of the wheel equipped frame structure 25 and is positioned to receive sand from the discharge chute 138. It is essentially self-contained, serves, in addition to screening and aerating the sand, to discharge the sand in stream form into a windrow or pile for purposes of re-use and comprises a gyratory screen 221, a hopper 222, a blade equipped rotor 223, a housing 224 around the rotor, a discharge spout 225 on the housing and an electric motor 226 for driving the rotor and gyrating the screen. As best shown in Figures 16 and 19, the unit is inclined at an acute angle with respect to the vertical to the end that the gyratory screen 221 slopes downwards. An annular or ring shaped turntable 227 serves, together with hereinafter recited additional parts, to support the unit so that it is bodily rotatable about a vertical axis throughout an arc of approximately 240°.

The screen 221 of the unit 34 is removably mounted in a rectangular frame 228 and, as shown in Figure 19, is zigzag from the upper portion thereof to its lower portion. The hopper 222 has the frame 228 connected to its upper end and is yieldingly supported by a pair of posts 229 and a single post 230. The posts 229 are upwardly inclined and extend at right angles to the screen frame 228. The upper ends of the posts 229 carry rubber collars 231 and these are mounted within sleeves at certain of the corners of the hopper 222. The lower ends of the posts 229 are provided with rubber collars 232 and these are clamped to the ends of a horizontal angle bar 233. As shown in Figures 15 and 16, the bar 233 overlies the turntable 227. It is positioned to one side of the center of the turntable and is supported in an elevated position by way of a pair of upstanding brackets 234. The lower ends of these brackets are welded or otherwise fixedly secured to the subjacent portions of the turntable and the upper ends of the brackets are welded to the end portions of the angle bar 233. The post 230 is in parallel relation with the posts 229 and has on its upper end a rubber collar 235 which fits within a depending sleeve on a bracket 236. The latter is connected to, and projects from, the upper portion of the hopper 222. The lower end of the post 230 has mounted thereon a pair of rubber collars 237 and these are in clamped relation with a bracket 238 which is connected to, and projects radially from, the casing of the electric motor 226. The rubber collars on the posts 229 and the post 230 permit the hopper 222, together with the screen 221, to gyrate, i. e., move universally to a limited extent. When the screen is gyrated, as hereinafter described, the sand which is discharged onto the screen from the discharge chute 138 at the upper end of the hollow column 28 passes through the screen and any large sized foreign objects are separated from, and travel downwards across, the screen to a discharge lip 239 on the lower portion of the upper end of the hopper 222. The separated objects, due to the gyratory action of the screen, pass over the lip 239 and drop by gravity.

The upper end of the hopper 222 is rectangular in cross section and its intermediate portion and lower end are downwardly tapered. The hopper embodies at its lower end a flange-formed annular discharge 240 and serves to direct the screened sand into the central portion of the interior of the blade equipped rotor 223.

The rotor of the unit 34 is located directly beneath the hopper 222 and comprises an elongated, upwardly inclined hub part 241, a bottom ring 242, a top ring 243 and an annular series of blades 244. The lower end of the hub part 241 is provided with a downwardly flared flange 245, the outer margin of which is shaped to form an annular seat 246 in which the inner margin of the bottom ring 242 fits. The top ring 243 of the rotor has the same external diameter as the bottom ring 242 and is spaced above the bottom ring. The blades 244 are removably connected to upstanding ribs which extend between the bottom and top rings 242 and 243 and have the lower and upper margins thereof suitably connected to such rings respectively. When the unit 34 is in operation as the result of drive of the electric motor 226 the screened sand that is discharged from the hopper 222 into the central portion of the interior of the rotor, is directed outwards by centrifugal force along the downwardly flared flange 245 at the lower end of the hub part 241 and is flung outwards by the blades 244.

The housing 224 is suitably connected to the upper end of the casing of the electric motor 226 and consists of a cast metal cylindrical side wall 247 and an arcuate liner 248. The liner extends around the inner periphery of the side wall 247 and is formed of suitable wear resisting material. It surrounds and extends between the outer margins of the bottom and top rings 242 and 243 of the rotor and serves to confine the sand that is flung outwards by the rotor blades 244. The side wall 247 of the housing has a discharge opening (not shown) adjacent the ends of the arcuate liner and embodies at the sides of the discharge opening a pair of outwardly extending ears 249. When the unit 34 is in operation the sand that is flung outwards by the blades 244 of the rotor travels around the liner 248 until it reaches the aforementioned discharge opening in the side wall of the housing. At such point it is flung forcibly outwards in stream form through the discharge opening and past the ears 249. The aforementioned discharge opening in the side wall 247 of the unit housing 224 is located at the high portion of the housing and is at one side of the post 230, as shown in Figure 19.

The discharge spout 225 serves to guide the stream of sand emanating from the discharge opening in the housing and consists of a top wall 250 and a pair of side walls 251. The side walls are connected to, and depend from, the side margins of the top wall 250 and have the inner ends thereof pivotally connected to the outer ends of the ears 249 by pivot bolts 252 in order that the spout may be swung upwards and downwards in order to direct, as desired, the stream of sand resulting from operation of the blade equipped rotor 223. When the spout 225 is swung upwards the stream travels a comparatively great distance and when the spout is swung downwards the length of the stream is materially reduced.

The electric motor 226 comprises in addition to the casing an annular stator 253 and a rotor 254 within the stator. The rotor is supported by way of an upwardly inclined shaft 255, the lower end of which is journalled in an anti-friction bearing 256 in the lower end wall of the motor casing. The upper end of the shaft 255 extends into, and is suitably fixedly secured to, the hub part 241 of the rotor 223 to the end that the blade equipped rotor is driven in response to drive of the rotor 254 of the motor 226. The motor 226 is supported above the turntable 227 by a pair of bracket plates 257. The latter are located at one side of the angle bar 233 and have the lower margins thereof welded to the turntable. The upper ends of the bracket plates 257 are connected to diametrically opposite parts of the side wall of the casing of the motor 226 by bolts 258. The switch for controlling the motor 226, like the switch for the motor 203, is preferably mounted on the switch box 129 in order that it is within the reach of the operator of the apparatus when he is standing in position opposite the control levers 76 and 104.

The screen 221 is gyrated for screening purposes by means of an upwardly inclined shaft 259. The latter is located above the motor shaft 255 and fits snugly within the inner race of a roller bearing 260. The outer race of such bearing is mounted in a cap 261 which is bolted to the upper end of the hub part 241 of the blade equipped rotor 223. The upper end of the shaft 259 is provided with an enlarged head 262 which is suitably secured to the central portion of the hopper 222 of the unit 34. The roller bearing 260 is positioned eccentrically so far as the motor shaft 255 is concerned with the result that when the motor 226 is in operation the shaft 259 revolves in a circular course around the axis of the motor shaft and serves to gyrate the hopper 222 and the screen 221. A counterweight 263 is connected to one side of the cap 261 for balancing purposes.

The annular turntable 227 has a diametric channel bar 264 and overlies a rectangular bed-plate 265 on the rear end of the frame structure 25. The channel bar 264 is arranged so that the side flanges thereof project downwards and has its ends welded to diametrically opposite parts of the hole defining portion of the turntable 227. As shown in Figures 14 and 15 the front and rear margins of the bed-plate 265 rest on, and are secured to, the top flanges of the crossbeams 37 and the side margins of the plate rest on, and are secured to, the adjacent portions of the top flanges of the side beams 35 of the frame structure 25. The central portion of the bed-plate is provided with a circular hole 266 and this is bridged by a diametric channel bar 267 which, as shown in Figure 14, is arranged so that the side flanges thereof project outwards. An annular series of ball bearings 268 serves to support the bed-plate so that it is revolvable about its center. The central and lower portions of the ball bearings 268 are mounted in cup shaped housings 269 which are fixedly connected to the hole defining portion of the bed-plate. The turntable 227 is provided at its outer margin with a depending flange 270 and this surrounds the ball bearings 268 and their housings 269. By turning the turntable the screening, aerating and discharging unit 34 may be swung so as to cause the discharge spout 221 to face rearwards of the frame structure 25 or to either side.

In order releasably to retain the turntable 227 and the unit 34 in the various positions into which they are turned or adjusted locking mechanism 271 is provided. This mechanism comprises a lower friction disc 272, a coacting upper friction disc 273, and a toggle linkage 274. The lower friction disc 272 is of less diameter than, and concentrically positioned with respect to, the circular hole 266 in the central portion of the bed-plate 265 and rests on, and is welded or otherwise fixedly secured to, the central portion of the diametric channel bar 267 which, as previously pointed out, is in fixed relation with the bed-plate. The upper friction disc 273 is the same in diameter as, and overlies, the lower friction disc 272 and is welded to the central portions of the side flanges of the diametric channel bar 264. When such channel bar is deflected downwards the upper friction disc 273 is brought into frictional engagement with the lower friction disc 272 and coacts therewith to hold the turntable and unit in place. The toggle linkage 274 serves, in response to actuation thereof, to deflect the channel bar 264 downwards and comprises an outer link 275, an inner link 276, a bell crank 277, a bolt 278 and a vertical sleeve 279. The outer and inner links 275 and 276 are in substantially longitudinal alignment. They are disposed beneath the bed-plate 265 and extend radially with respect to the turntable 227. The outer link 275 of the toggle linkage 274 extends through a vertically elongated slot 280 in the web portion of the rear end of the left hand side beam 35 of the frame structure 25 and has at its outer end a foot pedal 281. It is centrally fulcrumed or pivoted to swing in a vertical plane by a horizontal pivot pin 282 which is disposed a short distance inwards of the slot 280 and has its ends connected to a bracket structure 283. The inner link 276 embodies at its outer end a fork 284. This is in straddled relation with the inner end of the outer link 275 and is pivotally connected thereto by a horizontal pivot pin 285. The bell crank 277 of the toggle linkage 274 embodies a depending substantially vertical arm and a substantially horizontal arm as shown in Figure 14 and has its central portion pivotally supported by a horizontal pin 286. The latter is carried by a bracket 287 which is connected to, and depends from, the central portion of the diametric channel bar 267. The lower ends of the vertical arms of the bell crank 277 are pivotally connected by a horizontal pivot pin 288 to the inner end of the inner link 276. The operative length of the outer and inner links 275 and 276 between the pivot pins 282 and 286 is greater than the distance between said pivot pins. When the locking mechanism 271 is inoperative or ineffective the outer and inner links assume a wide angle V as shown in Figure 14. When the foot pedal 281 is depressed the inner end of the outer link 275 swings upwards and operates through the medium of the inner link 276 to swing the bell crank 277 in a counterclockwise direction as viewed in Figure 14. When the foot pedal 281 is swung upwards the inner link 276 operates to swing the bell crank in a clockwise direction. The bolt 278 of the toggle linkage 274 extends transversely and projects through the sleeve 279. The lower end of the bolt embodies an eye-like head and this fits between the outer or distal ends of the horizontal arms of the bell crank 277 and is pivotally connected thereto by a horizontal pin 289. The upper end of the bolt 278 projects above the upper end of the sleeve 279 and has mounted thereon a washer 290 and a pair of nuts 291. The washer, as shown in Figure 14, abuts against the upper end surface of the sleeve 279. The upper end of the sleeve extends through a hole in the center of the diametric channel bar 264 and is welded to such beam. The lower end of the sleeve extends slidably through a tubular member 292 which extends through, and is welded to, a hole in the center of the diametric channel bar 267. When the bolt 278 is subjected to downward force as the result of counterclockwise swinging of the bell crank 277 in response to depression of the foot pedal 281 it operates through the medium of the sleeve 279 downwardly to deflect the channel bar 266 and this, in turn, operates, as hereinbefore pointed out, to cause the upper disc 273 frictionally to engage the lower disc 272 and thus lock the turntable 227 and the screening, aerating and discharging unit against turning about the axis of the turntable. When the foot pedal 281 is depressed to such an extent that the pivot pin 285 between the adjacent ends of the outer and inner links 275 and 276 is above dead center the toggle linkage 274 will remain operative. In other words, the locking mechanism will remain in its locked position. To release the mechanism 271 from such position it is only necessary to raise the foot pedal 281 to such an extent as to cause the pivot pin 285 to swing downwards past dead center. This releases the tension on the bolt 278 and the sleeve 279 and frees the upper friction disc 273 from the lower friction disc 272. From the foregoing it is clearly manifest that when it is desired to lock the turntable 227 and the unit 34 against rotation or turning the foot pedal 281 is depressed and when it is desired to release the mechanism the foot pedal is swung upwards.

In order to catch the non-metallic foreign objects which drop from the discharge lip 229 after being separated from the sand by the gyratory screen 221 a channel shaped collector ring 293 is provided. This ring surrounds the self-contained screening, aerating and discharging unit 34 and is secured in place by brackets 294. The latter are connected to, and project upwards from, the rear ends of the side beams 35 of the frame structure 25. As best shown in Figures 1 to 4, inclusive, the collector ring 293 comprises an annular bottom wall 295, and circular upstanding side walls 296 and is so positioned and of such size that the discharge lip 239 at the lower portion of the upper end of the hopper 222 of the unit 34 overlies it regardless of the position into which the unit is turned or rotatively adjusted. The side portions of the collector ring are downwardly bowed in order that the objects that are collected by the ring will gravitate to the central parts of the side portions of the ring where they are readily accessible for removal. For the purpose of permitting the collected objects to be removed from the ring the central parts of the side portions of the outer side wall of the ring are provided with discharge openings 297. These openings are normally closed by gates 298 which are slidably held in place by guides 299. The guides are secured to the portions of the outer side wall of the ring that define the discharge openings 297 and permit the gates to be slid upwards so as to expose the openings and also downwards into a closed position whereby they serve to close the discharge openings. The upper margins of the gates 298 are provided with handles 300 in order that they may be slid into and out of place.

*Operation*

When it is desired to use the apparatus the hollow column 28, by proper manipulation of the irreversible gearing 29, is tilted so as to raise the screw conveyor 30 and the plow 143 above the foundry floor. After this operation the motor 59 is energized and the apparatus, by proper control of the mechanisms 26 and 27, is propelled at travelling speed to that portion of the foundry floor which is covered by previously used molding sand. As soon as the apparatus is properly positioned the hand wheel 156 is turned by the operator so as to tilt the hollow column a sufficient distance to locate the screw conveyor and plow at the proper height above the floor. If the plow is lowered so that the lower portions of the wear plates 146 and 149 are below the bottom portions of the wheels 42 the plow, in connection with forward propulsion of the apparatus, will result in the machine cutting a down-hill path and this is sometimes necessary when the sand on the floor has built up to too great an extent and it is desired to cut or plow the sand so that it maintains a predetermined or desired level. If it is desired to cut a path in the sand a predetermined distance above the floor the plow is positioned so that the lower portions of the aforementioned wear plates are disposed above the bottom portions of the wheels 42. After the plow is adjusted to the proper height the hand wheel 60a is turned until the speed reducing unit 20 is set or adjusted to the point where the driving or operating speed of the apparatus will match the height of the sand on the foundry floor. If, as previously pointed out, the sand on the floor is deep the speed reducing unit 60 is set for slow speed drive and if the sand is sparsely piled on the floor the speed reducing unit is set to operate at a higher speed. It is contemplated that the speed of travel of the apparatus will match the volumetric displacement of the screw conveyor to the end that no sand will spill over the plow 143 during forward propulsion of the apparatus. Thereafter the switches for the electric motors 203 and 226 are closed. As soon as the motors 203 and 226 are set in operation drive of the screw conveyor 30, the bucket elevator 31, the rotary magnetic separator 32 and the unit 34 occurs. Prior to propulsion of the apparatus towards the sand on the foundry floor the unit 34 is turned so as properly to position the discharge spout 225. After turning of the unit 34 into the desired position the foot pedal 281 is depressed so as to energize or actuate the locking mechanism 271 and thus retain in position the unit 34. After adjustment of the speed reducing unit 60 the levers 76 and 104 are swung inwards so as to energize the driving mechanisms 26 and 27. This results in forward propulsion of the apparatus in a rectilinear course. As the apparatus travels forwards the screw conveyor 30 directs the sand that is confined by the plow 143 towards the lower end of the bucket elevator 31 and the elevator elevates the sand in its buckets and discharges it into the discharge chute 138. As the sand passes downwards through such chute it is subjected to the action of the rotary magnetic separator 32. The latter, as heretofore described, serves to remove from the sand iron or other scrap. From the discharge chute 138 the sand passes to the unit 34 where it is successively screened, aerated and discharged. The position of the discharge spout determines the type of discharge of sand from the unit. If the discharge spout is located at one side of the apparatus and maintained in a fixed position while the apparatus is being propelled forwards the discharged sand will form a windrow. If it is desired to accumulate the discharged sand in a pile while the apparatus is being forwardly propelled the unit 34 is turned so that the discharge spout extends rearwards and in connection with forward travel of the apparatus the spout is progressively swung upwards so as to increase the range of the stream and result in the stream forming the desired pile. If it is desired to turn the apparatus one of the control levers is swung outwards and the other control lever is swung inwards. This results in braking of one of the wheel driving mechanisms and actuation of the other. After the apparatus is turned to the desired extent the levers are swung inwards so that the apparatus will again travel forwards in the desired course. To stop the apparatus the levers are swung outwards in order to effect application of the brakes.

The herein described sand handling apparatus effectively and efficiently fulfills its intended purpose and involves a compact and novel arrangement of parts. It has great capabilities of use in that in connection with operation thereof it may be controlled so as to form the discharged sand into a windrow or a pile.

Whereas the apparatus has been described for use in handling molding sand in a foundry it is to be understood that it may be used to handle and condition other granular or pulverulent material. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A portable apparatus designed for use in handling and conditioning sand in a foundry and comprising a horizontally elongated wheel-equipped frame structure, sand accumulating and elevating means mounted on the front end of the frame structure, a rotary power driven magnetic separator supported in an elevated position over the rear end of the frame structure, arranged to receive sand from said means and operative, when driven, to separate metallic scrap from the sand that is delivered thereto, and a self-contained sand screening, aerating and discharging unit disposed beneath, and adapted to receive sand from, the separator, consisting of a gyratory screen, a blade equipped rotor beneath the screen, a housing around the rotor and with a vertically tiltable laterally extending spout for discharging the sand in loose stream form, and a motor for gyrating the screen and driving the rotor, and having coacting elements between its lower portion and the subjacent portion of the rear end of the frame structure whereby it is mounted so that it is capable of being rotated bodily back and forth about a vertical axis in order to position the discharge spout so that it faces rearwards or to either side of the frame structure and controls the stream of sand to form a pile when the apparatus is stationary or to form a windrow in connection with propulsion of the apparatus.

2. A portable apparatus designed for use in handling and conditioning sand in a foundry and comprising a horizontally elongated wheel-equipped frame structure, sand accumulating and elevating means mounted on the front end of the frame structure, a rotary power driven magnetic separator supported over the rear end of the frame structure, arranged to receive sand from said means and operative when driven to separate metallic scrap from the sand that is delivered thereto, a self-contained sand screening, aerating and discharging unit disposed beneath, and adapted to receive sand from, the separator, consisting of a gyratory screen, a blade equipped rotor beneath the screen, a housing around the rotor and with a laterally extending spout for discharging the sand in loose stream form, and a motor for gyrating the screen and driving the rotor, and having coacting elements between its lower portion and the subjacent portion of the rear end of the frame structure whereby it is mounted so that it is capable of being rotated bodily back and forth about a vertical axis in order to position the discharge spout so that it faces rearwards or to either side of the frame structure and controls the stream of sand to form a pile when the apparatus is stationary or to form a windrow in connection with propulsion of the apparatus, and releasable locking mechanism for retaining the unit in the different positions into which it is rotated.

3. A portable apparatus designed for use in handling and conditioning sand in a foundry and comprising a horizontally elongated wheel-equipped frame structure, sand accumulating and elevating means mounted on the front end of the frame structure, a rotary power driven magnetic separator supported over the rear end of the frame structure, arranged to receive sand from said means and operative when driven to separate metallic scrap from the sand that is delivered thereto, a turntable mounted on the rear end of the frame structure beneath the separator, a self-contained sand screening, aerating and discharging unit adapted to receive sand from the separator, consisting of a gyratory screen, a blade equipped rotor beneath the screen, a housing around the rotor and with a laterally extending discharge spout for discharging the same in loose stream form, and an electric motor beneath the rotor for gyrating the screen and driving said rotor, and mounted on the turntable so that it is capable of being turned bodily back and forth about a vertical axis in order to position the discharge spout so that it faces rearwards or to either side of the frame structure and controls the stream of sand to form a pile when the apparatus is stationary or to form a windrow in connection with propulsion of the apparatus, and releasable locking mechanism extending between the frame structure and turntable, operative to retain the unit in the different positions into which it is turned, and embodying a movable pedal equipped control member projecting laterally from the frame structure and adapted to actuate and release said locking mechanism.

4. An apparatus designed for use in handling and conditioning sand in a foundry and comprising a horizontally elongated wheel-equipped frame structure provided with propelling mechanism therefor, sand accumulating and elevating means mounted on the front end of the frame structure, a magnetic separator supported over the rear end of the frame structure, arranged to to receive sand from said means and adapted to rid it of metallic scrap, a self-contained sand screening, aerating and discharging unit disposed beneath, and adapted to receive sand from, the separator, consisting of an inclined gyratory screen with a foreign object discharge at its lower portion, a blade equipped rotor beneath the screen, a housing around the rotor and with a laterally extending vertically tiltable discharge spout, and a motor for gyrating the screen and driving the rotor, and having coacting elements between its lower portion and the subjacent portion of the rear end of the frame structure whereby it is mounted so that it is capable of being turned bodily back and forth in order to vary the position of the discharge spout, and an arcuate collector member mounted fixedly on the rear end of the frame structure beneath the discharge at the lower portion of the screen and arranged to receive foreign objects from said discharge regardless of the position into which the unit is turned.

5. An apparatus designed for use in handling and conditioning sand in a foundry and comprising a horizontally elongated wheel-equipped frame structure provided with propelling mechanism therefor, sand accumulating and elevating means mounted on the front end of the frame structure, a self-contained sand screening, aerating and discharging unit arranged to receive sand from said means, consisting of an inclined gyratory screen with a foreign object discharge at the lower portion thereof, a blade equipped rotor beneath the screen, a housing around the rotor and with a laterally extending discharge spout for discharging the sand in stream form, and an electric motor for gyrating the screen and driving said rotor, and mounted on the rear end of the frame structure so that it is capable of being turned bodily about a vertical axis in order to position the discharge spout so that it faces rearwards or to either side of the frame structure, and an undulatory channel shaped collector ring mounted fixedly on the frame structure so that it extends around the unit and is adapted to receive foreign objects from said discharge regardless of the position into which the unit is turned, and having means on the lowermost portions thereof whereby the collected foreign objects may be discharged.

6. An apparatus designed for use in handling and conditioning sand in a foundry and comprising a horizontally elongated wheel-equipped frame structure having propelling mechanism therefor, sand accumulating and elevating means mounted on the front end of the frame structure, a rotary power driven magnetic separator supported over the rear end of the frame structure, arranged to receive sand from said means and operative when driven to separate metallic scrap from the sand that is delivered thereto, a turntable mounted on the rear end of the frame structure beneath the separator, a self-contained sand screening, aerating and discharging unit adapted to receive sand from the separator, consisting of an inclined gyratory screen with a foreign object discharge at the lower portion thereof, a blade equipped rotor beneath the screen, a housing around the rotor and with a laterally extending vertically tiltable discharge spout for discharging the same in stream form, and an electric motor beneath the rotor for gyrating the screen and driving said rotor, and mounted on the turntable so that it is capable of being turned bodily about a vertical axis in order to position the discharge spout so that it faces rearwards or to either side of the frame structure, releasable locking mechanism extending between said frame structure and turntable, operative to retain the unit in the different positions into which it is turned, and embodying a movable pedal equipped control member projecting laterally from the frame structure and adapted to actuate and release said locking mechanism, and an undulatory channel shaped collector ring mounted fixedly on the frame structure above the locking mechanism and arranged so that it extends around the unit and receives foreign objects from said discharge at the lower portion of the screen regardless of the position into which the unit is turned.

7. An apparatus designed for use in handling and conditioning sand in a foundry and comprising a horizontally elongated frame structure having a caster type wheel assembly at the rear end thereof and a pair of coaxial independently rotatable wheels at its front end and provided at said front end with a laterally extending platform, a reversible electric motor mounted on the platform, a pair of selectively controllable driving mechanisms associated with the coaxial wheels respectively, connected for actuation by the motor and embodying manually manipulable control elements therefor positioned adjacent the platform and in side by side relation and arranged so they may be manipulated by the operator of the apparatus while standing or walking on the ground, sand accumulating and elevating means mounted on the front end of the frame structure and arranged to discharge the sand over the rear end of said frame structure, a rotary power driven magnetic separator supported over the rear end of the frame structure, arranged to receive the sand discharged from said means and operative when driven to separate metallic scrap from the sand that is delivered thereto, a self-contained motor driven sand screening, aerating and discharging unit disposed beneath, and adapted to receive the sand from, the separator, consisting of a screen, a blade equipped rotor beneath the screen, and a housing around the rotor and with a laterally extending discharge spout, and mounted on the frame structure so that it is capable of being turned bodily about a vertical axis in order to position the discharge spout so that it faces rearwards or to either side of the frame structure, and releasable locking mechanism operative to retain the unit in the different positions into which it is turned and embodying a movable control element projecting laterally from the frame structure, located at the same side of said frame structure as said control elements, and adapted to actuate and release said locking mechanism.

8. An apparatus designed for use in handling and conditioning sand in a foundry and comprising a horizontally elongated frame structure having propelling mechanism therefor, an upstanding hollow column located at the front end of the frame structure and embodying a downwardly and rearwardly extending discharge chute at its upper end, a forwardly facing U-shaped plow disposed adjacent the lower end of the column, adapted when the apparatus is propelled forwards on a floor with sand thereon to confine the sand within it, having an upwardly and rearwardly inclined back wall, pivotally connected to the front end of the frame structure so that it is capable of being raised and lowered relatively to said lower end of the column, and provided with adjustable supporting means therefor, a horizontal power driven screw conveyor mounted at the lower end of the column and also within, but independently of, the plow, embodying at its ends right and left hand spiral sections, and operative to move towards its central portion the sand confined by the plow, a power driven bucket elevator disposed within and extending lengthwise of the column and operative to elevate the sand from the central portion of the screw conveyor and discharge it into the discharge chute at the upper end of the column, and a motor driven sand screening, aerating and discharging unit disposed beneath, and adapted to receive sand from, the discharge chute, embodying a laterally extending discharge spout, and mounted on the rear end of the frame structure.

9. An apparatus designed for use in handling and conditioning sand in a foundry and comprising a horizontally elongated frame structure having propelling mechanism therefor, an upstanding hollow column located at the front end of the frame structure, pivotally supported at its central portion so that it is capable of tilting lengthwise of the frame structure, and embodying a downwardly and rearwardly extending discharge chute at its upper end, a forwardly facing U-shaped plow disposed adjacent the lower end of the column, adapted when the apparatus is propelled forwards on a floor with sand thereon to confine the sand within it, having an upwardly and rearwardly inclined back wall, pivotally connected to the front end of the frame structure to swing up and down, and provided between it and the lower end of the column with an adjustable connection whereby it is caused to swing up and down with the lower end of the column in connection with tilting of the column and in addition is capable of being swung up and down relatively to said lower end of the column, a horizontal power driven screw conveyor mounted at the lower end of the column and also within, but independently of, the plow, embodying at its ends right and left hand spiral sections, and operative to move towards it central portion the sand confined by the plow, a power driven bucket elevator disposed within and extending lengthwise of the column and operative to elevate the sand from the central portion of the screw conveyor and discharge it into the discharge chute at the upper end of the column, and a motor driven sand screening, aerating and discharging unit disposed beneath, and adapted to receive sand from, the discharge chute, embodying a laterally extending discharge spout, and mounted on the rear end of the frame structure.

10. An apparatus designed for use in handling and conditioning sand in a foundry and comprising a horizontally elongated frame srtucture having propelling mechanism therefor, an upstanding hollow column located at the front end of the frame structure, pivotally supported at its central portion so that it is capable of tilting lengthwise of the frame structure, and embodying a downwardly and rearwardly extending discharge chute at its upper end, a forwardly facing U-shaped plow disposed adjacent the lower end of the column, adapted when the apparatus is propelled forwards on a floor with sand thereon to confine the sand within it, having an upwardly and rearwardly inclined back wall, pivotally connected to the front end of the frame structure to swing up and down, and provided between it and the lower end of the column with a turnbuckle type connection whereby it is caused to swing up and down with the lower end of the column in connection with tilting of the column and in addition is capable of being adjusted up and down relatively to said lower end of the column, a horizontal power driven screw conveyor mounted at the lower end of the column and also within, but independently of the plow, embodying at its ends right and left hand spiral sections, and operative to move towards its central portion the sand confined by the plow, a power driven bucket elevator disposed within and extending lengthwise of the column and operative to elevate the sand from the central portion of the screw conveyor and discharge it into the discharge chute at the upper end of the column, and a self-contained sand screening, aerating and discharging unit disposed beneath, and adapted to receive sand from, the separator, consisting of a gyratory screen, a blade equipped rotor beneath the screen, a housing around the rotor and with a laterally extending discharge spout, and a motor beneath the rotor for gyrating the screen and driving said rotor, and mounted on the frame structure so that it is capable of being turned bodily in order to vary the position of the discharge spout.

11. An apparatus designed for use in handling and conditioning sand in a foundry and comprising a horizontally elongated wheel equipped frame structure having at its front end a pair of laterally spaced standards and a pair of horizontal platforms outwards of the lower ends of the standards, mechanism for driving certain of the wheels of the frame structure for apparatus propelling purposes including an electric motor mounted on one of the platforms, an upstanding hollow column located at said front end of the frame srtucture between the standards, provided at its lower end with a forwardly facing U-shaped plow for confining sand when the apparatus is propelled forwards over a floor with sand thereon, embodying a downwardly and rearwardly extending discharge chute at its upper end, and having its central portion pivotally connected to the upper ends of the standards so that it is capable of tilting back and forth lengthwise of the frame structure in order to raise and lower the plow, a horizontal screw conveyor mounted at the lower end of the column and within the plow, embodying as its ends right and left hand screw sections, and operative when driven to move towards its central portion the sand confined by the plow, a bucket elevator disposed within and extending lengthwise of the column, operative when driven to elevate the sand from the central portion of the screw conveyor and discharge it into the discharge chute, and connected to drive the screw conveyor, a rotary magnetic separator disposed adjacent the discharge chute and operative when driven to rid the sand flowing through the chute of metallic scrap, and electric motor mounted on the other platform, mechanism for conjointly driving the elevator and separator from the last mentioned motor including a rotary element mounted to revolve about the tilting axis of the column, and a self-contained sand screening, aerating and discharging unit disposed beneath, and adapted to receive sand from, the discharge chute, embodying a laterally extending discharge spout and mounted on the rear end of the frame structure so that it is bodily rotatable about a vertical axis in order to vary the position of the discharge spout.

12. An apparatus designed for use in handling and conditioning sand in a foundry and comprising a horizontally elongated wheel equipped frame structure having at its front end a pair of laterally spaced standards and a pair of horizontal platforms outwards of the lower ends of the standards, mechanism for driving certain of the wheels of the frame structure for apparatus propelling purposes including an electric motor mounted on one of the platforms, an upstanding hollow column located at said front end of the frame structure between the standards, pivotally supported at its central portion adjacent the upper ends of the standards so that it is capable of tilting lengthwise of the frame structure, and embodying a downwardly and rearwardly extending discharge chute at its upper end, a forwardly facing U-shaped plow disposed adjacent the lower end of the column, adapted when the apparatus is propelled forwards on a floor with sand thereon to confine the sand within it, pivotally connected to the front end of the frame structure to swing up and down, provided between it and the lower end of the column with an adjustable connection whereby it is caused to swing up and down with the lower end of the column in response to tilting of said column and in addition is capable of being swung up and down relatively to said lower end of the column, reversible gearing operative to tilt the column and embodying an actuating element adjacent said one platform, a horizontal screw conveyor mounted at the lower end of the column and within the plow, embodying at its ends right and left hand spiral sections, and operative when driven to move toward its central portion the sand confined by the plow, a bucket elevator disposed within and extending lengthwise of the column, operative when driven to elevate the sand from the central portion of the screw conveyor and discharge it into the discharge chute, and connected to drive the screw conveyor, an electric motor mounted on the other platform, mechanism operative to drive the elevator from the last mentioned motor and including a rotary element mounted to revolve about the tilting axis of the column, and a self-contained sand screening, aerating and discharge unit disposed beneath, and adapted to receive sand from, the discharge chute, embodying a discharge spout, and mounted on the rear end of said frame structure.

13. An apparatus designed for use in handling and conditioning sand in a foundry and comprising a horizontally elongated frame structure having a caster type wheel assembly at the rear end thereof and a pair of coaxial independently rotatable wheels at its front end, and provided at said front end with a pair of laterally spaced standards and a pair of horizontal platforms outwards of the lower ends of the standards, an electric motor mounted on one of the platforms, a pair of selectively controllable driving mechanisms associated with the coaxial wheels respectively, connected for actuation by the motor, and embodying control elements therefor adjacent the platform for said motor, an upstanding hollow column located at said front end of the frame structure between the standards, provided at its lower end with a forwardly facing U-shaped plow for confining sand when the apparatus is propelled forwards over a floor with sand thereon, embodying a downwardly and rearwardly extending discharge chute at its upper end, and having its central portion pivotally connected to the upper ends of the standards so that it is capable of tilting back and forth lengthwise of the frame structure in order to raise and lower the plow, reversible gearing operative to tilt the column and embodying an actuating hand wheel adjacent the control elements for said driving mechanisms, a horizontal screw conveyor mounted at the lower end of the column and within the plow, embodying at its ends right and left hand spiral sections, and operative when driven to move towards its central portion the sand confined by the plow, a bucket elevator disposed within and extending lengthwise of the column and operative when driven to elevate the sand from the central portion of the screw conveyor and discharge it into the discharge chute at the upper end of the column, an electric motor mounted on the other platform, mechanism actuated by the last mentioned motor and connected to drive the screw conveyor and the bucket elevator, and a sand aerating and discharging unit disposed beneath, and adapted to receive sand from, the discharge chute, embodying a laterally extending discharge spout, and mounted on said rear end of the frame structure.

14. An apparatus designed for use in handling and conditioning sand in a foundry and comprising a horizontally elongated frame structure having a caster type wheel assembly at the rear end thereof and a pair of coaxial independently rotatable wheels at its front end, and provided at said front end with a pair of laterally spaced standards and a pair of horizontal platforms outwards of the lower ends of the standards, an electric motor mounted on one of the platforms, a pair of selectively controllable driving mechanisms associated with the coaxial wheels respectively, connected for actuation by the motor, and embodying control elements therefor adjacent the platform of said motor, an upstanding hollow column located at said front end of the frame structure between the standards, provided at its lower end with a forwardly facing U-shaped plow for confining sand when the apparatus is propelled forwards over a floor with sand thereon, embodying a downwardly and rearwardly extending discharge chute at its upper end, and having its central portion pivotally connected to the upper ends of the standards so that it is capable of tilting back and forth lengthwise of the frame structure in order to raise and lower the plow, irreversible gearing operative to tilt the column and embodying an actuating hand wheel adjacent the control elements for said driving mechanisms, a horizontal screw conveyor mounted at the lower end of the column and within the plow, embodying at its ends right and left hand spiral sections, and operative when driven to move towards its central portion the sand confined by the plow, a bucket elevator disposed within and extending lengthwise of the column and operative when driven to elevate the sand from the central portion of the screw conveyor and discharge it into the discharge chute at the upper end of the column, a rotary magnetic separator disposed adjacent the discharge chute and operative when driven to rid the sand passing through the chute of metallic scrap, an electric motor mounted on the other platform, mechanism operated to drive the screw conveyor, bucket elevator and separator from the last mentioned motor and including a rotary element mounted to revolve about the tilting axis of the column, and a self-contained sand screening, aerating and discharging unit disposed beneath and adapted to receive sand from the discharge chute, embodying a laterally extending discharge spout, and mounted on the rear end of the frame structure so that it is bodily rotatable about a vertical axis in order to vary the position of the discharge spout.

GEORGE J. KOREN.

References Cited in the file of this patent

UNITED STATES PATENTS

| Number | Name | Date |
|---|---|---|
| 1,335,641 | Beardsley et al. | Mar. 30, 1920 |
| 1,499,426 | Townsend | July 1, 1924 |
| 1,534,331 | Simpson | Apr. 21, 1925 |
| 1,860,481 | Royer | May 31, 1932 |
| 2,034,203 | Piper | Mar. 17, 1936 |
| 2,164,799 | Davies | July 4, 1939 |
| 2,309,036 | Beardsley | Jan. 19, 1943 |
| 2,384,083 | Doberstein | Sept. 4, 1945 |
| 2,387,159 | Lee | Oct. 16, 1945 |

FOREIGN PATENTS

| Number | Country | Date |
|---|---|---|
| 513,516 | Germany | Nov. 28, 1930 |
| 533,279 | Germany | Sept. 10, 1931 |